US012735298B1

(12) United States Patent
Rookey et al.

(10) Patent No.: US 12,735,298 B1
(45) Date of Patent: Sep. 15, 2026

(54) ELECTROMECHANICAL SENSING AND SAFETY ACTUATION OF ELEVATOR GOVERNORS

(71) Applicant: Otis Elevator Company, Farmington, CT (US)

(72) Inventors: Ralle Rookey, Suffield, CT (US); Thomas Masayda, Watertown, CT (US); Thomas Brey, Farmington, CT (US); Xiaodong Luo, South Windsor, CT (US); Thomas Girard, Simsbury, CT (US); Yingxin Gao, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 19/233,714

(22) Filed: Jun. 10, 2025

(51) Int. Cl.
*B66B 5/04* (2006.01)
*B66B 3/00* (2006.01)
*B66B 5/18* (2006.01)

(52) U.S. Cl.
CPC .............. *B66B 5/046* (2013.01); *B66B 3/002* (2013.01); *B66B 5/18* (2013.01)

(58) Field of Classification Search
CPC ........... B66B 5/046; B66B 3/002; B66B 5/18; B66B 5/044
See application file for complete search history.

(56) References Cited

U.S. PATENT DOCUMENTS

| | | | | |
|---|---|---|---|---|
| 5,005,681 A * | 4/1991 | Pipes | B66F 9/07 187/374 |
| 5,377,786 A * | 1/1995 | Nakagawa | B66B 5/044 187/373 |
| 8,950,554 B2 * | 2/2015 | Niikawa | B66B 5/044 187/305 |
| 9,517,918 B2 * | 12/2016 | Dube | F16D 3/10 |
| 10,654,685 B2 * | 5/2020 | Fauconnet | B66B 5/0087 |
| 11,034,546 B2 * | 6/2021 | Kwon | B66B 5/044 |
| 11,365,091 B2 * | 6/2022 | Shi | F16H 21/16 |
| 11,453,571 B2 * | 9/2022 | Liu | B66B 5/044 |
| 11,465,881 B2 * | 10/2022 | Shi | B66B 5/044 |
| 11,858,780 B1 * | 1/2024 | Wang | B66B 5/22 |

(Continued)

FOREIGN PATENT DOCUMENTS

EP 3798174 A1 * 3/2021 ............... B66B 5/18

*Primary Examiner* — Michael A Riegelman
(74) *Attorney, Agent, or Firm* — CANTOR COLBURN LLP

(57) ABSTRACT

Elevator system governors include a housing, a first pulley, a second pulley, and a cable wound about the two pulleys. A target element is arranged on at least one of the pulleys and a motion sensor assembly is arranged to detect the target element and determine if an overspeed condition is present. An electromagnet is operably coupled to the motion sensor assembly that is configured to transition the electromagnet from a first electromagnetic state to a second electromagnetic state in response to a detected overspeed condition. A trigger arm is releasably connected to the electromagnet and configured to actuate a safety brake assembly with a biasing element arranged to bias the trigger arm into an actuated state with a magnetic force of the electromagnet being greater than a biasing force of the biasing element when the electromagnet is in the first electromagnetic state.

14 Claims, 16 Drawing Sheets

(56) References Cited

U.S. PATENT DOCUMENTS

| | | | | |
|---|---|---|---|---|
| 12,358,759 | B1 * | 7/2025 | Martins | B66B 11/0246 |
| 2012/0205198 | A1 * | 8/2012 | Okada | B66B 5/22 187/350 |
| 2013/0098711 | A1 * | 4/2013 | Aguado | B66B 5/22 187/373 |
| 2015/0136544 | A1 * | 5/2015 | Dube | B66B 5/044 464/77 |
| 2018/0037438 | A1 * | 2/2018 | Shi | B66B 5/044 |
| 2018/0044135 | A1 * | 2/2018 | Jimenez-Gonzalez | B66B 5/0087 |
| 2018/0118515 | A1 * | 5/2018 | Shi | B66B 5/044 |
| 2020/0002128 | A1 * | 1/2020 | Kwon | B66B 5/044 |
| 2020/0109032 | A1 * | 4/2020 | Shi | B66B 5/0087 |
| 2020/0172376 | A1 * | 6/2020 | Shi | B66B 5/044 |
| 2023/0399199 | A1 * | 12/2023 | Ruhnke | B66B 5/0087 |
| 2024/0199376 | A1 * | 6/2024 | Muñoz Sotoca | B66B 5/044 |
| 2026/0077978 | A1 * | 3/2026 | Tang | B66B 1/3492 |

* cited by examiner

ELECTROMECHANICAL SENSING AND SAFETY ACTUATION OF ELEVATOR GOVERNORS

BACKGROUND

The present disclosure relates to elevator systems and, in particular, to an elevator system and more particularly to electromechanical safety actuation of elevator governors.

Typical elevator mechanical safety systems use governor overspeed systems coupled to a mechanical safety actuation module that is connected to a safety brake (or brakes) that activate in the event of a car overspeed event, car over-acceleration event, free fall, or the like. The elevator safety system will operate or actuate to stop motion of an elevator traveling component (e.g., elevator car, counterweight, etc.) that is travelling too fast. Such safety actuation modules include a linking mechanism to engage one or more car safety brakes simultaneously (e.g., on one or more respective guide rails associated with the elevator system). The governor is located either in a machine room, in the hoistway or elevator shaft, or may be mounted to the traveling component. After the elevator safety system is operated to stop movement of the traveling component, resetting of the elevator safety system may be necessary to allow the traveling component to resume normal operation, and to reset the safety system for future safety operations. Improving mechanisms for operating and resetting such elevator safety systems may be beneficial, such as by reducing complexity and/or costs associated with such systems and improving safety features thereof.

SUMMARY

According to some embodiments, elevator system governors are provided. The elevator system governors include a housing configured to be mounted to a traveling component of the elevator system, a first pulley arranged on the housing, a second pulley arranged on the housing, and a cable wound about the first pulley and the second pulley, with the first and second pulleys being configured to travel along the cable. A target element is arranged on at least one of the first pulley and the second pulley. A motion sensor assembly is arranged to detect the target element and determine if an overspeed condition is present based thereon. An electromagnet is operably coupled to the motion sensor assembly, with the motion sensor assembly being configured to transition the electromagnet from a first electromagnetic state to a second electromagnetic state in response to a detected overspeed condition. A trigger arm is releasably connected to the electromagnet and operably coupled to a safety brake assembly. The trigger arm is magnetically secured to the electromagnet when the electromagnet is in the first electromagnetic state and when the electromagnet is transitioned to the second electromagnetic state the trigger arm is configured to actuate the safety brake assembly. A biasing element is arranged to bias the trigger arm into an actuated state, wherein a magnetic force of the electromagnet is greater than a biasing force of the biasing element when the electromagnet is in the first electromagnetic state.

In addition to one or more of the features described above, or as an alternative, further embodiments of the elevator system governors may include a reset arm, wherein the electromagnet is fixedly attached to the reset arm.

In addition to one or more of the features described above, or as an alternative, further embodiments of the elevator system governors may include a reset assembly arranged to cause the reset arm to move the electromagnet into contact with the trigger arm when the trigger arm is in the actuated state.

In addition to one or more of the features described above, or as an alternative, further embodiments of the elevator system governors may include that the reset assembly is configured to apply a force to the reset arm and the trigger arm, via the electromagnet, to overcome the biasing force of the biasing element, and reset the trigger arm to a normal operating state.

In addition to one or more of the features described above, or as an alternative, further embodiments of the elevator system governors may include that the reset assembly comprises a linear actuator.

In addition to one or more of the features described above, or as an alternative, further embodiments of the elevator system governors may include that the reset assembly comprises a motored gear and the reset arm comprises a toothed portion configured to be driven by the motored gear.

In addition to one or more of the features described above, or as an alternative, further embodiments of the elevator system governors may include an intermediate arm rotationally mounted to the reset arm, wherein the intermediate arm is configured to releasably be retained by the electromagnet and the trigger arm is configured to selectively engage with the intermediate arm.

In addition to one or more of the features described above, or as an alternative, further embodiments of the elevator system governors may include that the motion sensor assembly comprises a control element with a processing unit and a detector element arranged to detect the target element.

In addition to one or more of the features described above, or as an alternative, further embodiments of the elevator system governors may include a toothed configuration on at least one of the first pulley and the second pulley and a latch operably mounted to the reset arm, wherein the latch is configured to engage with the toothed configuration during a loss of power to the elevator system governor.

In addition to one or more of the features described above, or as an alternative, further embodiments of the elevator system governors may include that the latch is configured to be engaged with the toothed configuration during motion of the respective traveling component to cause actuation of the trigger arm.

In addition to one or more of the features described above, or as an alternative, further embodiments of the elevator system governors may include that the biasing element is a compression spring.

In addition to one or more of the features described above, or as an alternative, further embodiments of the elevator system governors may include that the biasing element is an expansion spring.

In addition to one or more of the features described above, or as an alternative, further embodiments of the elevator system governors may include that the traveling component is an elevator car.

In addition to one or more of the features described above, or as an alternative, further embodiments of the elevator system governors may include that the first electromagnetic state is an energized state of the electromagnet and the second electromagnetic state is a deenergized state of the electromagnet.

According to some embodiments, methods of stopping downward travel of a traveling component of an elevator system in response to a detected overspeed condition are provided. The methods include detecting the overspeed condition with a motion sensor assembly having a detector element arranged to detect a target element mounted to at least one pulley of an elevator system governor, transitioning an electromagnet from a first electromagnetic state to a second electromagnetic in response to detection of the overspeed condition, releasing a trigger arm from magnetic engagement with the electromagnet and urging the trigger arm into an actuated state by application of a biasing force from a biasing element, and actuating a safety brake assembly operably connected to the trigger arm.

In addition to one or more of the features described above, or as an alternative, further embodiments of the methods may include performing a resetting operation after the safety brake assembly is actuated. The resetting operation includes moving a reset arm that supports the electromagnet to move the electromagnet into contact with the trigger arm, transitioning the electromagnet from the second electromagnetic state to the first electromagnetic state to magnetically connect the trigger arm to the reset arm, and moving the reset arm to a normal operating state, wherein the moving of the reset arm causes movement of the electromagnet and the trigger arm, overcoming the biasing force of the biasing element.

In addition to one or more of the features described above, or as an alternative, further embodiments of the methods may include that the resetting operation is performed using a linear actuator operably coupled to the reset arm.

In addition to one or more of the features described above, or as an alternative, further embodiments of the methods may include that the resetting operation is performed using a motored gear, wherein the reset arm comprises a toothed portion that is engaged and driven by the motored gear.

In addition to one or more of the features described above, or as an alternative, further embodiments of the methods may include that when the electromagnet is transitioned to the second electromagnetic state, an intermediate arm is released from engagement with the electromagnet, and the trigger arm is configured to engage with the intermediate arm during normal operation and is released from the intermediate arm in response to a detected overspeed condition.

In addition to one or more of the features described above, or as an alternative, further embodiments of the methods may include that the elevator system governor comprises at least one pulley having a toothed configuration and a latch is configured to engage with the toothed configuration during a loss of power to the elevator system governor to cause actuation the safety brake assembly.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
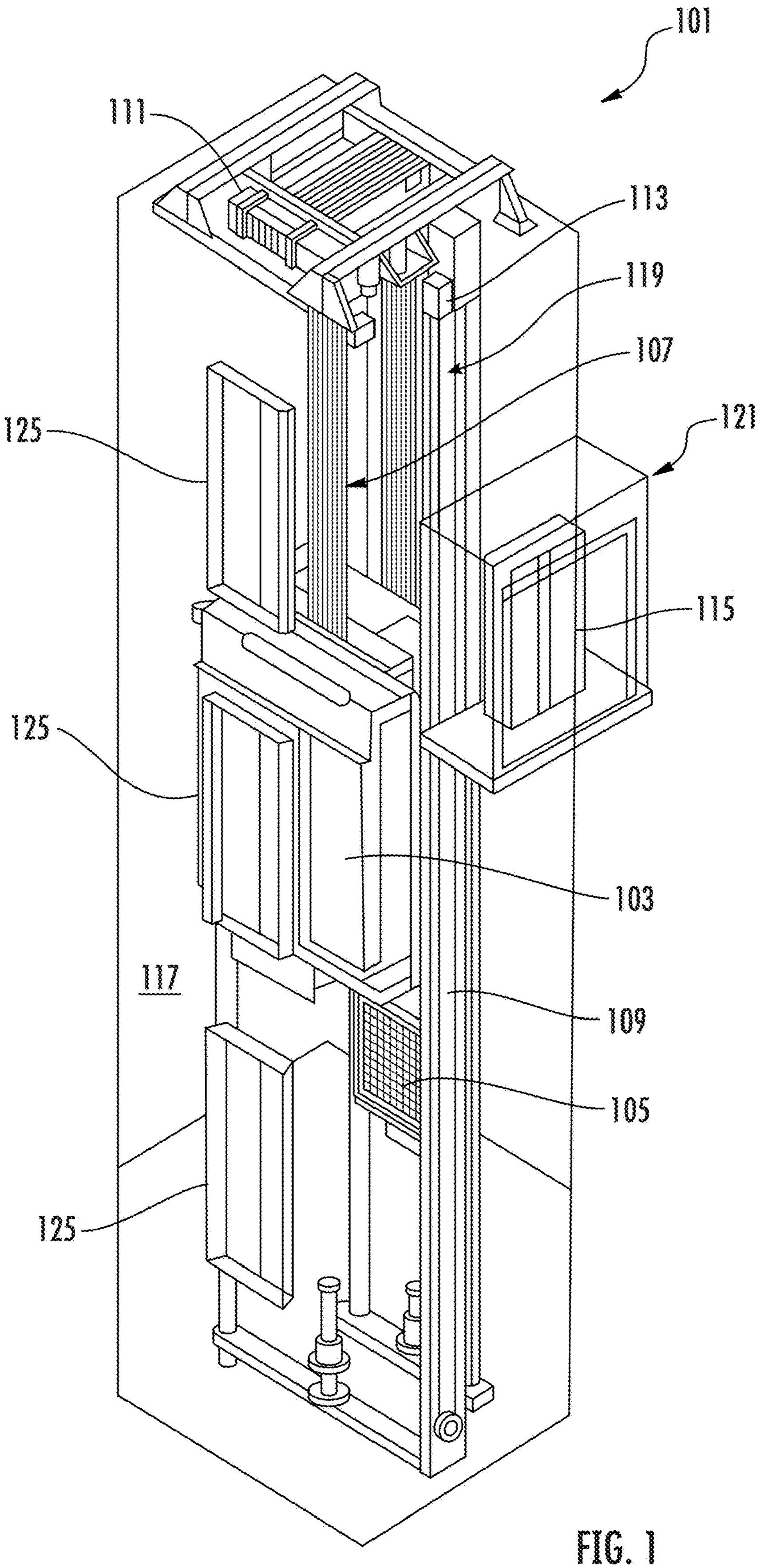
FIG. 1 is a perspective view of an elevator system in accordance with embodiments.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator traveling component (e.g., elevator car, counterweight) within an elevator shaft may employ embodiments of the present disclosure. FIG. 1 is merely a non-limiting example presented for illustrative and explanatory purposes.

Figure 2:
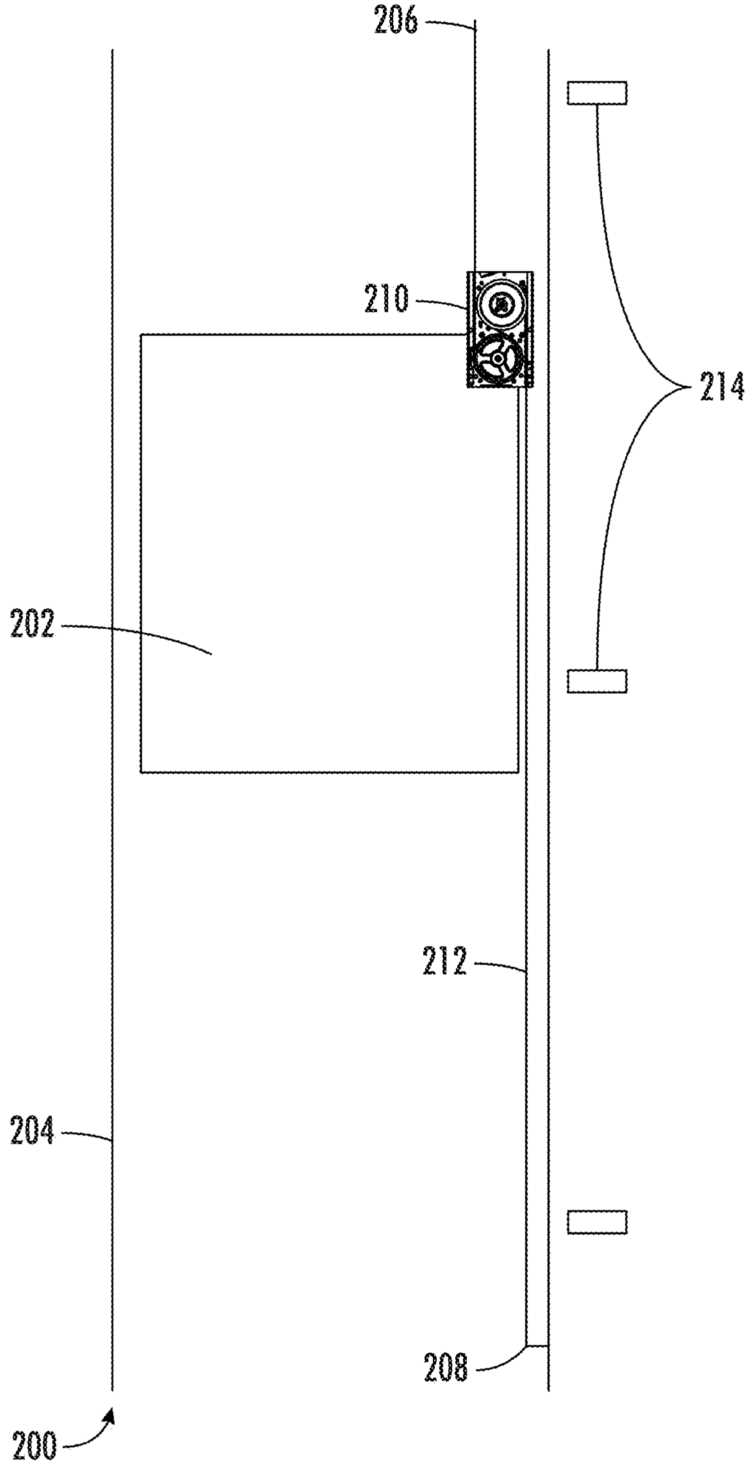
FIG. 2 is a schematic diagram illustrating an elevator system in accordance with embodiments.

With reference to FIG. 2, an elevator system 200 that may incorporate embodiments of the present disclosure is shown. The elevator system 200 includes an elevator car 202 that is configured to travel in a hoistway or elevator shaft 204. The elevator system 200 includes a rope anchor 206, a rope tensioning mass 208, a car mounted governor (CMG) 210, and a cable 212. The CMG 210 is affixable to the elevator car 202 and includes various components, including but not limited to a traction pulley, an idler pulley, and at least one encoder. Description and operation of a configuration of the CMG 210, as configured in accordance with embodiments of the present disclosure is described herein. The at least one encoder can be mountable on at least one of the traction pulleys and the idler pulley and can be configured to generate a signal reflective of rotation of the respective pulley. The cable 212 is extendible from the rope anchor 206, around the pulleys of the CMG 210, and to the rope tensioning mass 208. As the elevator car 202 travels along the hoistway 204, the pulleys of the CMG 210 will rotate and the cable 212 will be fed through the rotating pulleys (i.e., the cable 212 does not travel, but rather the pulleys rotate along the cable 212 as the elevator car 202 travels along the hoistway 204). Although shown and described as an elevator car 202, it will be appreciated that similar systems may be implemented with any elevator traveling component, including, without limitation elevator cars and counterweights. That is, the CMG 210 may be representative of a governor on any elevator system traveling component.

As shown in FIG. 2, the elevator system 200 may include one or more sensors 214 and/or magnetic strips. The sensors 214 can be positioned in or along the hoistway 204 and may be provided and configured for position detection of the elevator car 202 in the hoistway 204, as will be appreciated by those of skill in the art. The position detection can be used, for example, for calibration of the elevator system 200 and/or monitoring movement, speed, acceleration, and position of the elevator car 202 within the hoistway 204. The combination of the encoder on the CMG 210 and the sensors 214 may provide redundancy for position, movement, speed, and acceleration monitoring of the elevator car 202 within the hoistway 204.

Figure 3:
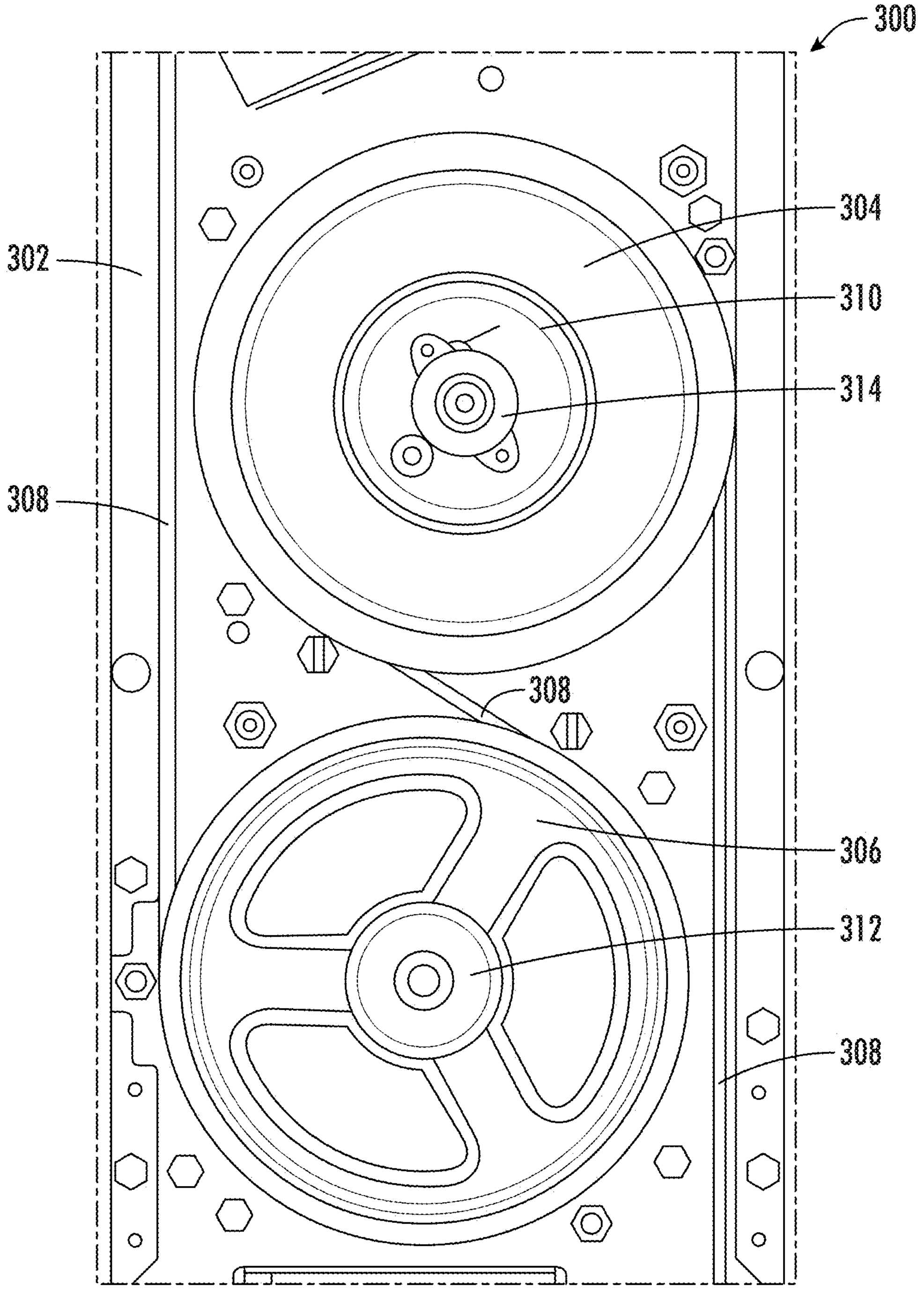
FIG. 3 is a schematic diagram of an elevator system governor that may incorporate embodiments of the present disclosure.

With reference to FIG. 3, a schematic illustration of a mounted governor 300 (e.g., mounted to an elevator traveling component, such as an elevator car or counterweight) that may incorporate embodiments of the present disclosure is shown. The governor 300 is configured to affix or otherwise be mounted or attached to an elevator car. The governor 300 includes a body 302, a traction pulley 304, and an idler pulley 306. A cable 308 is configured to extend between a rope anchor and a rope tensioning mass (e.g., see FIG. 2). The cable 308 is configured to be wound about the traction pulley 304 and the idler pulley 306, and the pulleys 304, 306 are configured to rotate and spin as an associated elevator car travels along an elevator shaft. The rotation of the pulleys 304, 306 may be monitored by one or more respective motion sensors 310, 312 (e.g., encoders, speed sensors, optical sensors, mechanical sensors, etc.). By monitoring the signals of the encoder(s) 310, 312 a computer or the like may be configured to monitor a position, speed, acceleration, or the like of an elevator car to which the governor 300 is mounted. The governor 300 may also include a locking mechanism 314. The locking mechanism 314 can be mountable to one of the pulleys 304, 306 or can be generally disposed anywhere within the governor 300. The locking mechanism 314 may be configured for safety actuation with remote tripping and can include a switch for periodic actuation checks, as will be appreciated by those of skill in the art.

The encoders on the governors, such as shown in FIG. 3 and in accordance with embodiments of the present disclosure, may be provided for speed and position feedback related to movement of an associated elevator car. The encoder configuration can provide precise car speed information. The speed, as obtained from the encoder(s) 310, 312, can be used to trigger an overspeed condition and apply (or drop) machine brakes to stop an elevator car and/or may be used to trigger an electro-mechanical mechanism to actuate the safeties of the traveling component (e.g., elevator car or counterweight). Embodiments of the present disclosure are directed to an electro-mechanical actuation mechanism with a motion sensor and actuator assembly that are configured to detect overspeed events, enable operation of a brake system, and may be used to reset the system after deployment.

In conventional elevator system governors, spinning weights (e.g., fly weights) are used to detect and trigger an overspeed switch and actuate safeties on the elevator car (and/or counterweight). The mechanical weight of this type of governor mechanism is complex and requires precise factory calibration. Furthermore, the spinning weights can cause false trips based on sudden accelerations of the elevator car due to inertia overshoot. Conventional governor systems of elevators may also require a minimum pull-through force in order to ensure that the safety brakes are engaged efficiently. However, such systems must also stay below a certain maximum pull-through force in order to prevent overstress of components.

In view of the above and other considerations, embodiments of the present disclosure are directed to car mounted governor systems that do not rely upon pull-through forces, can avoid false tripping, and can eliminate complicated or tedious factory calibration. Embodiments of the present disclosure are directed to car mounted governors that are mounted to elevator cars and interact with a cable running the length of an elevator shaft, such as shown and described above. In contrast to fly-weight configurations, a motion sensor, such as an encoder as shown in FIG. 3, may be employed. In some such configurations, a target may be attached to a pulley of the governor (e.g., pulleys 304, 306). A processor is configured to receive a signal from the motion sensor and determine if an overspeed condition exists. In some configurations, the processing of the signal may include signal filtering and/or processing algorithms to differentiate between an overspeed condition and other events (e.g., emergency stop, abnormal passenger behavior, etc.). In response to detection of an overspeed condition, an electromagnet may be triggered (e.g., an electromagnetic state is changed, such as powered or unpowered) and a tripping arm of the governor may be released, causing a spring force to rotate a tripping arm to thereby lift safeties into engagement with a guide rail and stop movement of the elevator car. In some embodiments, the electromagnet may be continuously powered or energized as a first electromagnetic state, and the actuation of the system is achieved via loss or removal of power or a deenergizing operation, resulting in a second electromagnetic state. In other embodiments, the opposite may be true. That is, in some embodiments, the electromagnet may be maintained in a first electromagnetic state of being unpowered or deenergized, and in response to the overspeed condition, the electromagnet may be supplied with power or may be energized.

Referring now to FIGS. 4A-4D, schematic illustrations of an elevator system governor 400 in accordance with an embodiment of the present disclosure are shown. The governor 400 is configured to affix or otherwise be mounted or attached to an elevator car (not shown). The governor 400 includes a body or housing 402, a first pulley 404, and a second pulley 406, similar to that shown and described above. A cable 408 is configured to extend between a rope anchor and a rope tensioning mass (e.g., see FIG. 2). The cable 408 is configured to be wound about the first pulley 404 and the second pulley 406, and the pulleys 404, 406 are configured to rotate and spin as the associated elevator car travels along an elevator shaft. The rotation of the pulleys 404, 406 may be monitored by a motion sensor assembly 410. The motion sensor assembly 410 includes a control element 412, a detector element 414, and a target element 416. The control element 412 may be a printed circuit board that includes various electronic components such as processing unit 413, memory, input/output elements, communication elements (wired or wireless), and the like. The detector element 414 may be mounted to and/or in operable communication with the control element 412. The detector element 414 is arranged to detect the target element 416 to obtain and calculate a travel speed of the associated elevator car.

By monitoring the signals of the detector element 414, the control element 412 may be configured to monitor a position, speed, acceleration, or the like of the elevator car to which the governor 400 is mounted. The cable 408 spans the length of the hoistway and interacts with the pulleys 404, 406. Linear motion of the elevator is directly transferred or converted to rotational motion of the pulleys 404, 406. The target element 416 is mounted to at least one of the pulleys 404, 406 (e.g., shown on first pulley 404), with the detector element 414 arranged and capable of detecting motion of the target element 416. During operation, a signal from the detector element 414 is received on or at the control element 412 which is configured to calculate the speed of the elevator car and determines if an overspeed or safety event condition is present. That is, the control element 412 is configured to receive, process, and monitor signals obtained at the detector element 414 as it detects the target element 416 rotating relative thereto.

It will be appreciated that a variety of technologies may be employed for the target element 416 and the associated detector element 414. For example, and without limitation, various magnetic sensors (e.g., Hall-effect sensors, tunneling magnetoresistance sensors, giant magnetoresistance sensors, etc.), optical sensors, electrical sensors, proximity sensors, encoders, or the like may be employed without departing from the scope of the present disclosure. It will be appreciated that the target element 416 and associated detector element 414 are configured as a complimentary set, such that the detector element 414 is configured to detect or measure a property or characteristic of the target element 416. A signal may be generated by the detector element 414 which may then be transmitted to the control element 412 for processing. As noted above, the processing unit 413 of the control element 412 that processes the signal from the detector element 414 and determines speed of an elevator car may also include special filtering and/or algorithms focused on false-trip prevention. While a rope and pulley system are used, as done in conventional systems, the governor 400 does not have the same traditional pull-through force requirements because the traction between the rope and pulley is not required to actuate the safeties, as will be explained below.

The actuation of the governor 400, in response to a detection of an overspeed condition by the motion sensor assembly 410, may be controlled by a control command from the motion sensor assembly 410. For example, the motion sensor assembly 410 may be operably connected to and configured to control a power supply to an electromagnet 418 of an actuator assembly 420. Stated another way, the motion sensor assembly 410 may be configured to control an electromagnetic state of the electromagnet 418 (e.g., energized or deenergized). The actuator assembly 420 includes a reset arm 422 and a trigger arm 424. The reset arm 422 is configured to support the electromagnet 418 and the trigger arm 424 is configured to selectively and/or releasably engage with the electromagnet 418. Each of the reset arm 422 and the trigger arm 424 are pivotably or rotationally mounted to the housing 402. In accordance with some embodiments, the electromagnet 418 may be fixedly attached to the reset arm 422. The trigger arm 424 may be formed of a material that is configured to be magnetically held and selectively secured by the electromagnet 418. In this illustrative configuration the trigger arm 424 is a two-piece construction. However, it will be appreciated that in other configurations, the trigger arm may be a single, unitary element, or may be formed from more than two pieces, without departing from the scope of the present disclosure.

In operation, and as described below, the trigger arm 424 may be released from engagement with the electromagnet 418 and urged to rotate, such as by application of a biasing force applied from a biasing element 426. For example, upon release from engagement with the electromagnet 418, the trigger arm 424 may be pulled downward (in FIG. 4A) and away from the electromagnet 418. As the trigger arm 424 is pulled downward at a first end 428 of the trigger arm 424 by the biasing element 426, a second end 430 of the trigger arm 424 is moved upward. The second end 430 of the trigger arm 424 may be operably coupled to a safety brake assembly 432 by means of a linkage 434, as will be appreciated by those of skill in the art. Such upward movement of the second end 430 of the trigger arm 424 will pull the linkage 434 upward and cause brake elements of the safety brake assembly 432 to engage with a guide rail or the like, to cause a braking force and stop downward movement of the elevator car. The actuator assembly 420 may include a reset assembly 436, which may be operated to reset the actuator assembly 420 after a safety operation is performed (e.g., braking), as described herein. The reset assembly 436 may be operably controlled (e.g., electronically controlled) by the processing unit 413 of the control element 412.

Figure 4A:
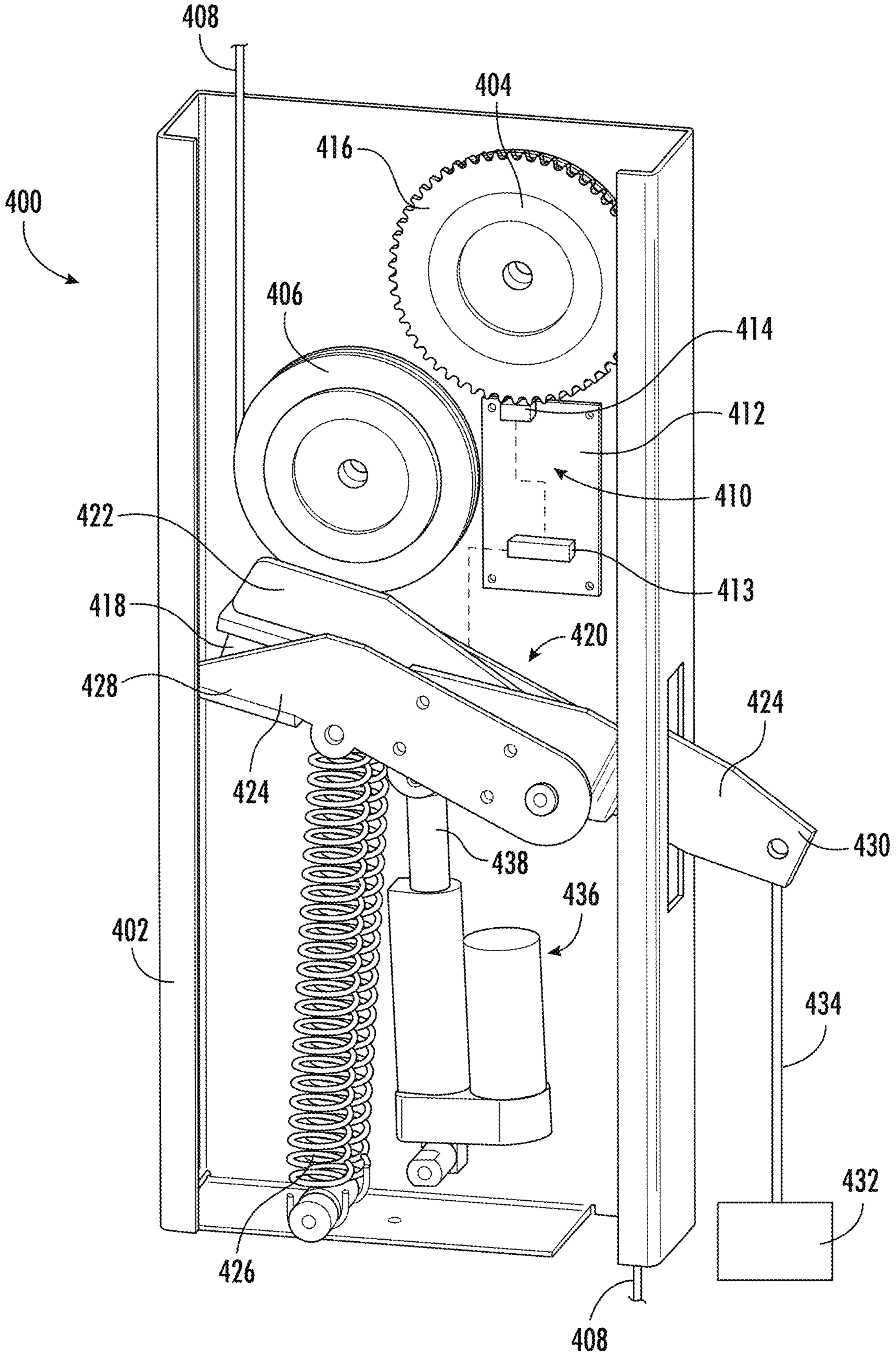
FIG. 4A is a schematic illustration of an elevator system governor in accordance with an embodiment of the present disclosure, shown in a normal state of operation.

FIG. 4A illustrates the governor 400 in a normal state of operation. In the normal state of operation, the governor 400 does not interfere with normal operation of an associated elevator and travel along an elevator shaft. During the normal state of operation shown in FIG. 4A, the trigger arm 424 is preloaded by the biasing element 426. The electromagnet 418 is maintained in a first electromagnetic state to generate a magnetic field and apply a magnetic force to the trigger arm 424 to overcome the biasing force of the biasing element 426 and hold the governor 400 in the normal state of operation. During operation, the detector element 414 is configured to detect a speed of travel of an associated traveling component by detecting the target element 416. The processing unit 413 of the control element 412 receives a signal from the detector element 414 and converts a rotational speed of the target element 416 to a vertical travel speed of the elevator. When an overspeed condition is detected based on the signal from the detector element 414, the electromagnet 418 may be controlled to change from the first electromagnetic state to a second electromagnetic state. For example, the first electromagnetic state may be an energized state and the second electromagnetic state may be a deenergized state. In such configurations, with the removal of power to the electromagnet 418, the magnetic force holding the trigger arm 424 is removed, and the biasing force of the biasing element 426 will pull the trigger arm 424 away from the electromagnet 418. It will be appreciated that the opposite power control may be employed, wherein the electromagnet in the first electromagnetic state is unpowered/deenergized, but generates a magnetic field, and a change to a powered state/energized state (i.e., the second electromagnetic state) will cause removal or elimination of the magnetic force, and the system may be actuated as described herein.

Figure 4B:
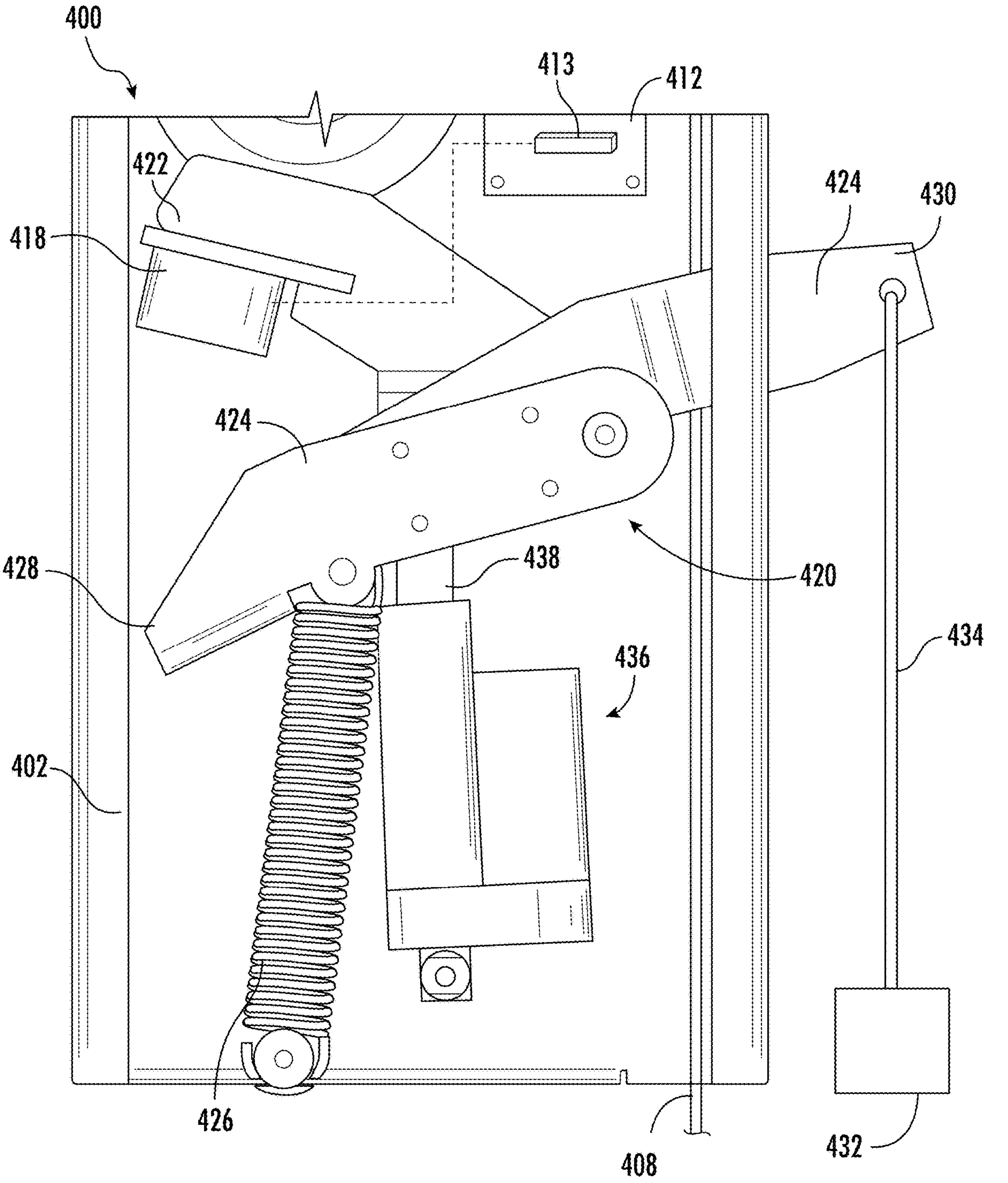
FIG. 4B is a schematic illustration of the elevator system governor of FIG. 4A illustrating an actuated state of the system.

During this motion, the first end 428 of the trigger arm 424 is pulled downward by the biasing element 426. As the first end 428 of the trigger arm 424 is moved or rotated downward, the second end 430 of the trigger arm 424 is moved upward, pulling the linkage 434 upward and causing brake elements of the safety brake assembly 432 to engage with a guide rail or the like and stop downward motion of the elevator car. FIG. 4B illustrates the actuated state of the governor 400. As shown, the first end 428 of the trigger arm 424 is released and separated from the electromagnet 418. The biasing element 426 acts on the first end 428 of the trigger arm 424 to pull it away from the electromagnet 418. As the first end 428 is urged downward, the second end 430 of the trigger arm 424 is lifted, acting upward on the linkage 434 to cause actuation of the safety brake assembly 432. After actuation, operation, or engagement of the safety brake assembly 432, the governor 400 will need to be reset to allow for normal operation of the elevator system.

Although described as a continuously powered electromagnet that is trigged upon removal of power, such configuration is not intended to be limiting. For example, in other embodiments, the opposite configuration may be employed. In such embodiments, the electromagnet may be configured to be unpowered in a normal operating (unactuated) state, and in the event of an overspeed condition, electrical power is supplied to the electromagnet to release the trigger arm. In some such configurations, the governor may be provided with a dedicated power supply, such as a battery or capacitor or the like, that is electronically controlled by the processing unit to cause the supply of power and subsequent release of the trigger arm.

Figure 4C:
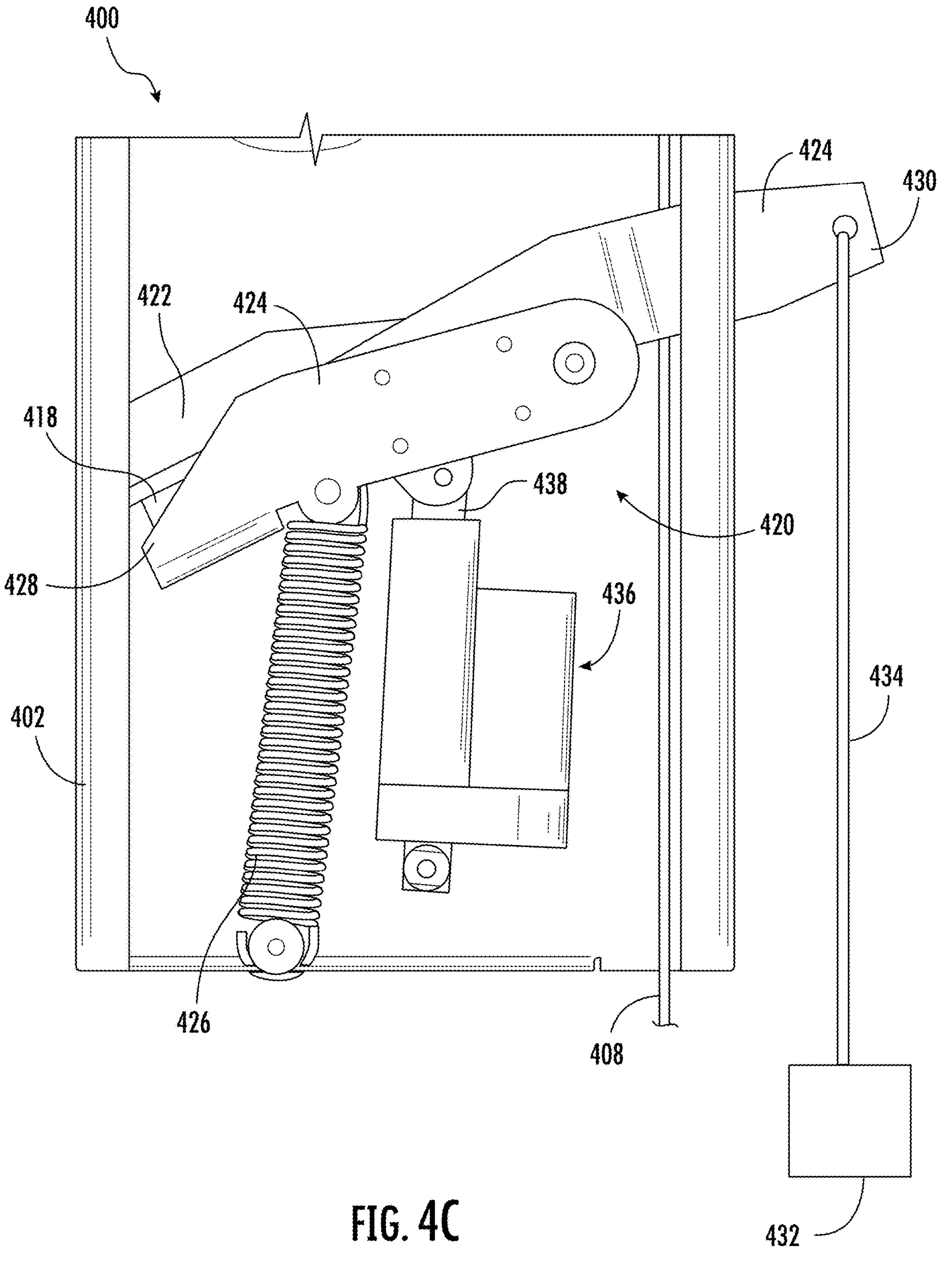
FIG. 4C is a schematic illustration of the elevator system governor of FIG. 4A shown in a partial state of reset after actuation.

Referring now to FIG. 4C, a schematic illustration of a mid-reset state of the governor 400 is shown. As shown in FIG. 4C, the reset assembly 436 has been operated to pull the reset arm 422 downward toward the trigger arm 424. During this motion, the electromagnet 418 will be brought into contact with the first end 428 of the trigger arm 424. Once the electromagnet 418 is in contact with the first end 428 of the trigger arm 424, the electromagnet 418 may be reenergized by supplying power thereto. It will be appreciated that the reenergizing of the electromagnet 418 may occur at any time after the release of the trigger arm 424 during an overspeed condition. The reset assembly 436 may include rods, linkages, biasing elements, or the like, which are operable to pull the reset arm 422 downward such that the electromagnet 418 contacts and can magnetically engage with the first end 428 of the trigger arm 424. In this illustrative configuration, a rod 438 of the reset assembly 436 is retracted into the reset assembly 436 and pulls the reset arm 422 downward. The rod 438 may be part of a linear actuator to drive linear motion, although other configurations may be employed without departing from the scope of the present disclosure. In this intermediate state, the safety brake assembly 432 is still activated and engaged to provide a braking force.

Figure 4D:
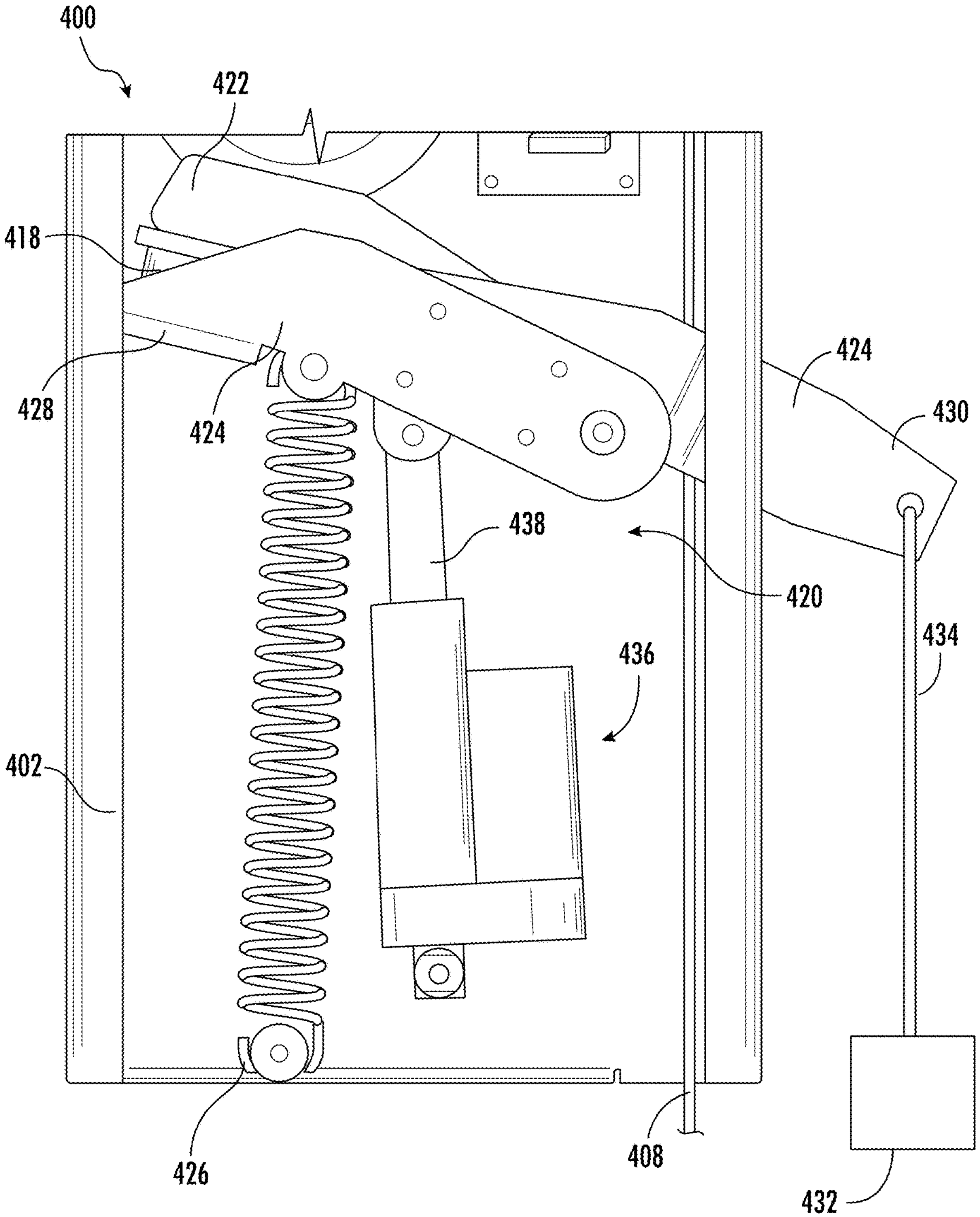
FIG. 4D is a schematic illustration of the elevator system governor, as reset.

FIG. 4D illustrates the reset of the governor 400. Once the electromagnet 418 is magnetically engaged with the trigger arm 424 (FIG. 4C), the reset assembly 436 may operate in a reverse direction to push the reset arm 422 upward and away from the reset assembly 436, such as by extension of a rod thereof. Because the electromagnet 418 is energized, as the reset arm 422 is lifted by the reset assembly 436, the first end 428 of the trigger arm 424 will also be lifted, and the second end 430 of the trigger arm 424 will be moved downward, thereby disengaging the safety brake assembly 432 from engagement with a guide rail. The operation of the reset assembly 436 will apply a force to overcome the biasing force of the biasing element 426, resetting the trigger arm 424 to be under load of the biasing element 426, but secured by the electromagnet 418 until power is cut therefrom. That is, operation of the reset assembly 436 causes the biasing element 426 to be extended under load and maintained under load by the energized electromagnet 418. It is noted that during the reset operation described above, such as when the safety brake assembly 432 is being disengaged from the guide rails, if an overspeed condition is detected again and/or the electrical power of the system is lost, the electromagnet 418 will be deenergized, releasing the trigger arm 424 and actuating the safety brake assembly 432 again. Accordingly, a safety feature of defaulting to engagement and braking is provided in the event of power loss, power failure, or further overspeed conditions being detected.

Figure 5A:
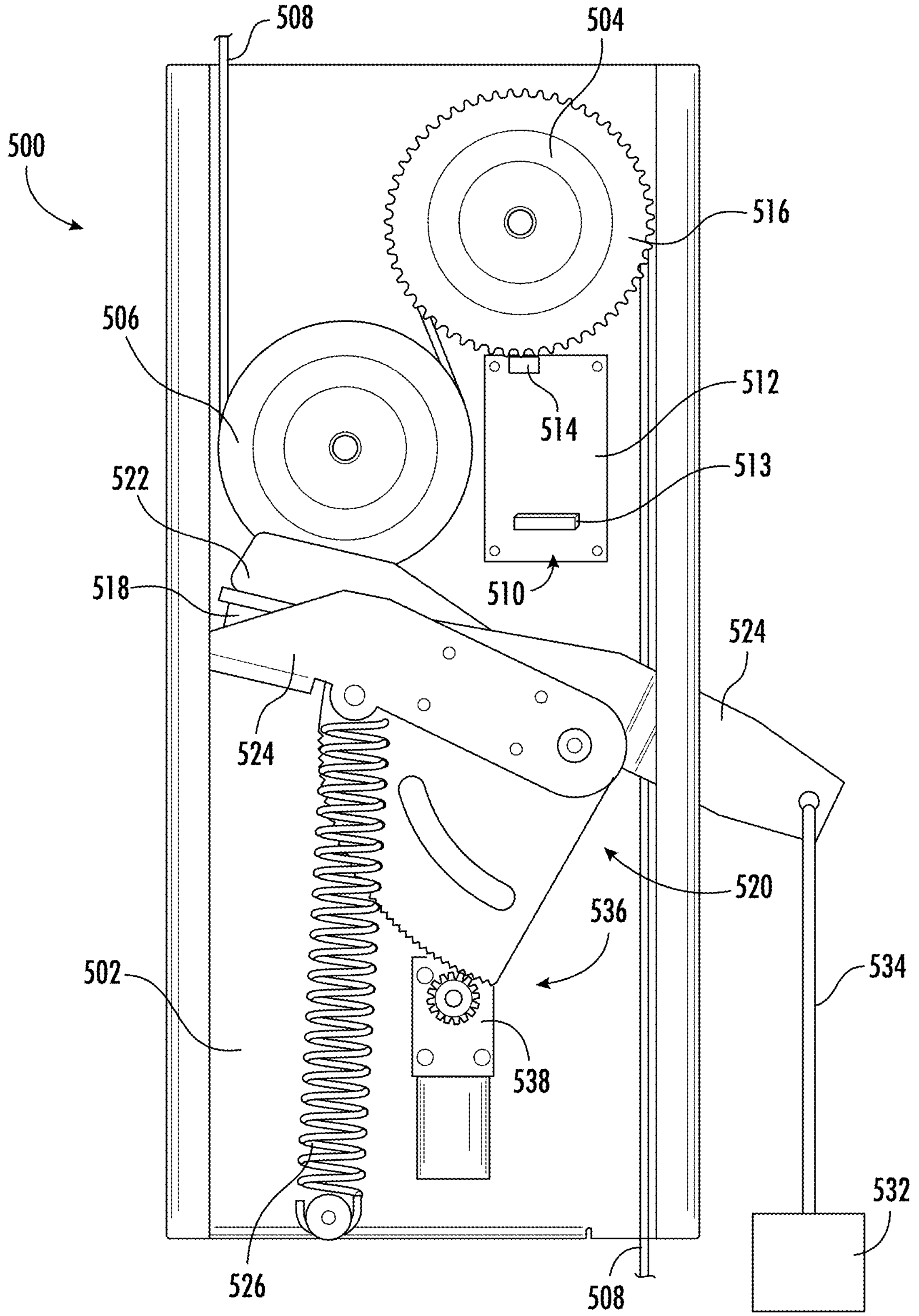
FIG. 5A is a schematic illustration of another configuration of an elevator system governor in accordance with an embodiment of the present disclosure.
Figure 5B:
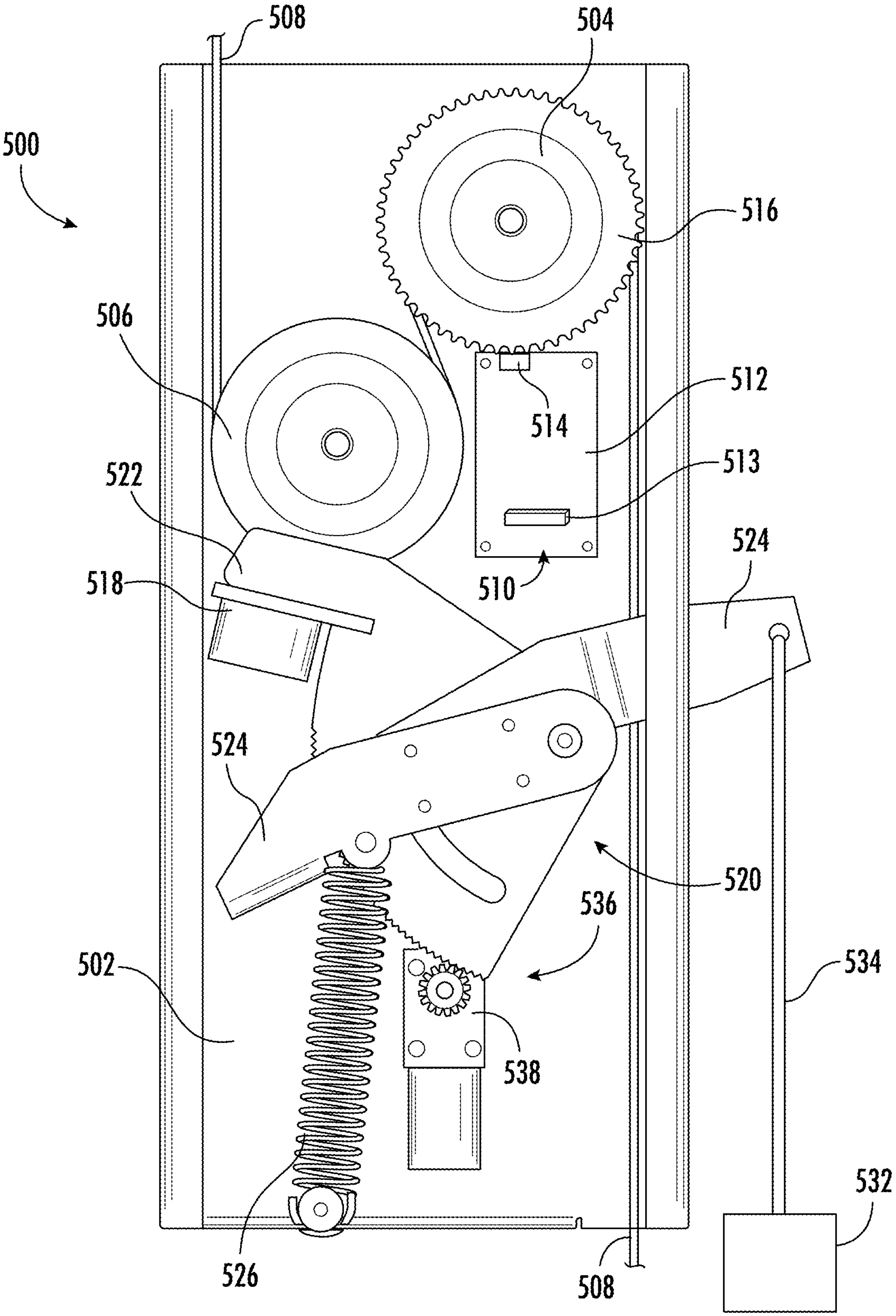
FIG. 5B is a schematic illustration of the elevator system governor of FIG. 5A shown in an actuated state.
Figure 5C:
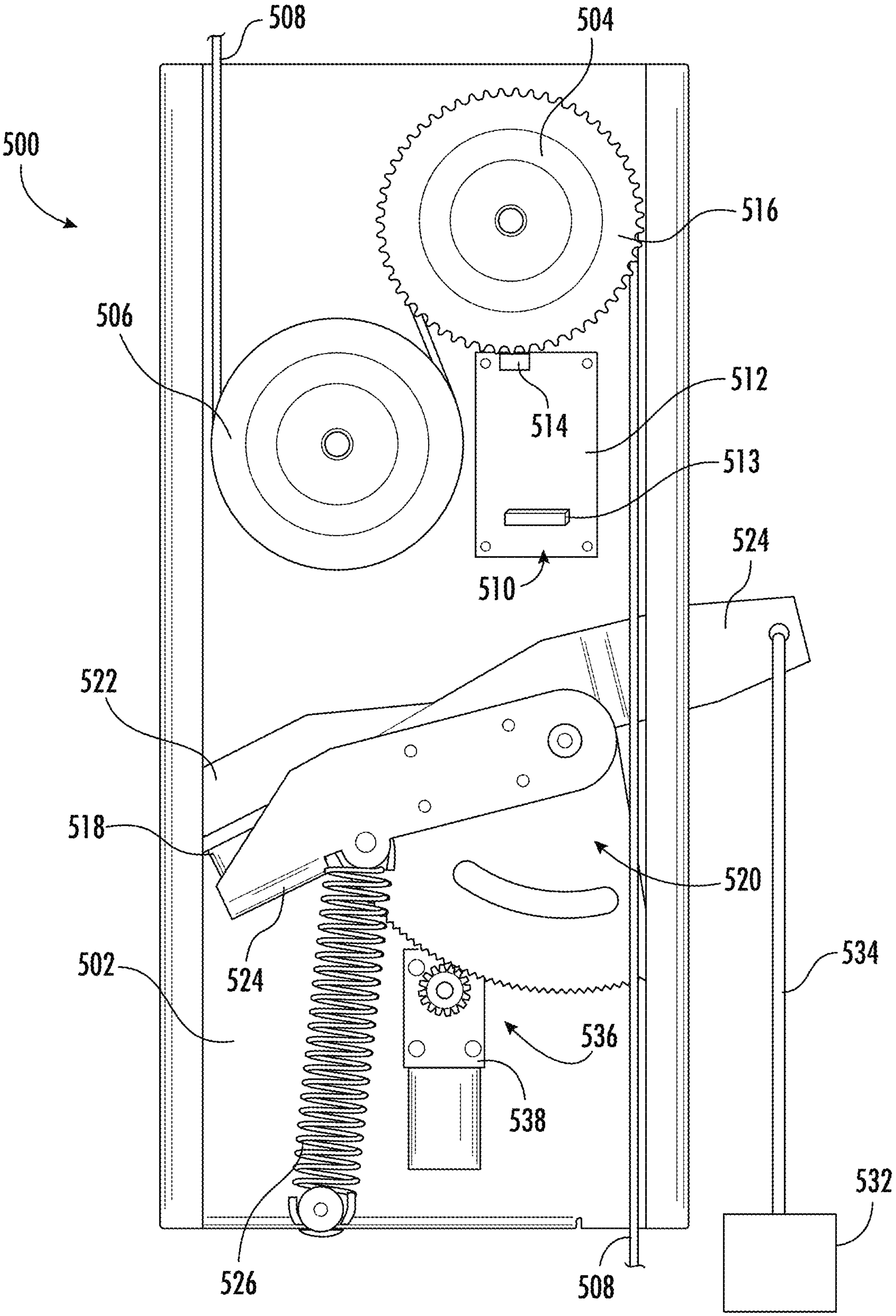
FIG. 5C is a schematic illustration of the elevator system governor of FIG. 5A shown in a partial state of reset after actuation.

Referring now to FIGS. 5A-5C, schematic illustrations of another configuration of a governor 500 for an elevator traveling component in accordance with an embodiment of the present disclosure are shown. FIG. 5A illustrates the governor 500 in the normal operating condition, where an elevator car may be free to travel along an elevator shaft. FIG. 5B illustrates a fully actuated state of the governor 500, which may occur after detection of an overspeed condition. FIG. 5C illustrates the governor 500 in a partial reset state illustrating features of the reset operation. Once the reset operation is complete, the governor 500 will be returned to the normal operating condition (FIG. 5A).

The governor 500 may be similar to that shown and described above. For example, the governor 500 includes a body or housing 502, a first pulley 504, and a second pulley 506, similar to that shown and described above. A cable 508 is configured to extend between a rope anchor and a rope tensioning mass. The cable 508 is configured to be wound about the first pulley 504 and the second pulley 506, as described above. A motion sensor assembly 510 is provided for monitoring a rotational speed of at least one of the pulleys 504, 506 and is configured to determine a travel speed of an associated elevator car, as described above. The motion sensor assembly 510 includes a control element 512 with a processing unit 513, a detector element 514, and a target element 516. The target element 516 may be mounted to the first pulley 504, although in other embodiments the target element may be mounted to the second pulley 506 and/or two target elements may be provided, one on each pulley 504, 506. A single detector element may be used or one detector element for each target element may be provided, as will be appreciated by those of skill in the art, whether in this configuration or in other configurations as shown and described herein.

The actuation of the governor 500, in response to a detection of an overspeed condition by the motion sensor assembly 510, may be controlled by a control command from the motion sensor assembly 510, as described above. Similar to the above-described embodiment, a power supply to an electromagnet 518 of an actuator assembly 520 may be controlled to cause actuation or operation of the governor in response to an overspeed condition. The actuator assembly 520 includes a reset arm 522 and a trigger arm 524. The reset arm 522 is configured to support the electromagnet 518 and the trigger arm 524 is configured to selectively and/or releasably engage with the electromagnet 518. Each of the reset arm 522 and the trigger arm 524 are pivotably or rotationally mounted to the housing 502 and may be operated similar to that shown and described above. The trigger arm 524 is connected to a biasing element 526 that is normally biased into an engaged position, but such biasing force is overcome by the electromagnet 518, thus holding the trigger arm 524 in a normal operating state or position. The trigger arm 524 is operably coupled to a safety brake assembly 532 by means of a linkage 534. During an overspeed condition, the electromagnet 518 is deenergized, and the electromagnet 518 releases the trigger arm 524 (FIG. 5B). As a result, the trigger arm 524 may be rotated by application of force from the biasing element 526 to cause actuation of the safety brake assembly 532, as described above.

The primary difference between the embodiment of FIGS. 4A-4D and the embodiment of FIGS. 5A-5C is the configuration of the actuator assembly 520, and specifically a reset assembly 536. In this illustrative configuration, the reset assembly 536 includes a motored gear 538 that is configured to drive rotation of the reset arm 522. The motored gear 538 may engage with a toothed portion of the reset arm 522, as illustratively shown. During a reset operation, the control element 512 may supply power or commands to the motored gear 538 to drive rotation of the gear and cause the reset arm 522 to rotate downward such that the electromagnet engages with the trigger arm 524. The motored gear 538 may then be driven in reverse to urge the trigger arm 524 upward by pulling the trigger arm 524 with the electromagnet 518 that is attached to the reset arm 522 and reset to the normal operating state or condition (FIG. 5A).

Figure 6C:
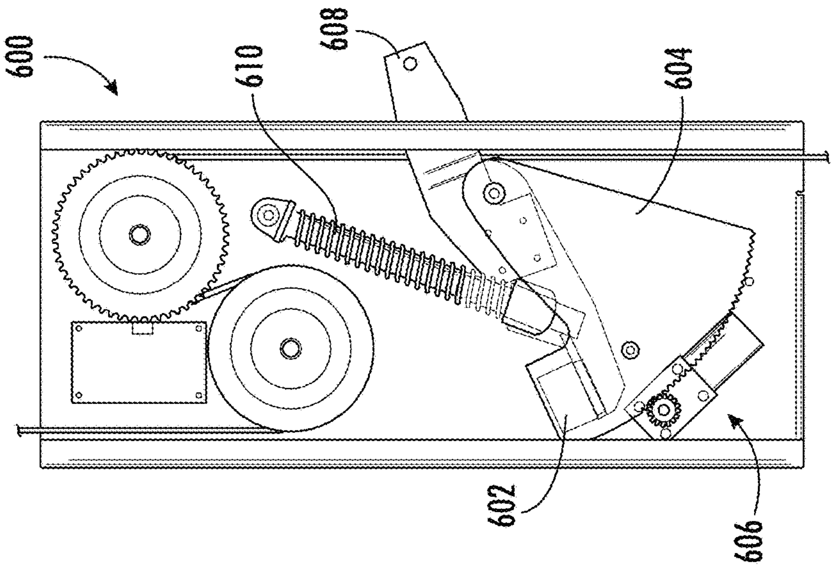
FIG. 6C is a schematic illustration of the elevator system governor of FIG. 6A shown in a partial state of reset after actuation.
Figure 6B:
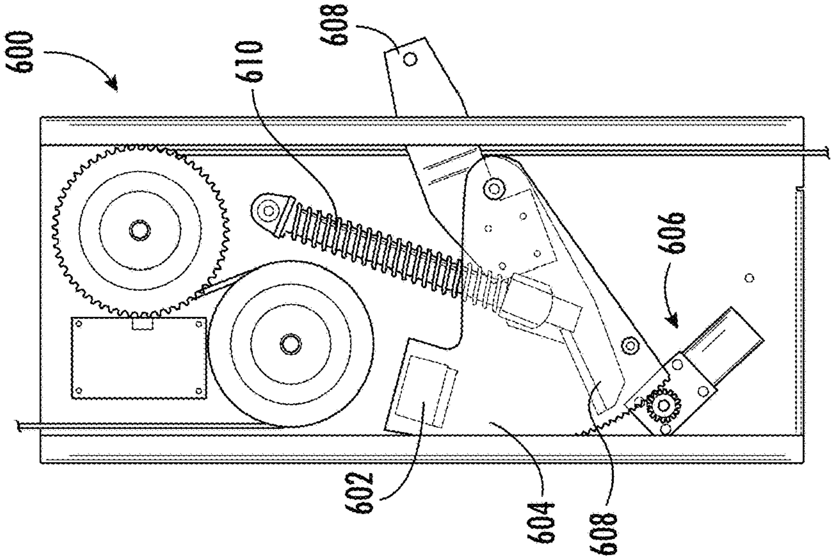
FIG. 6B is a schematic illustration of the elevator system governor of FIG. 6A shown in an actuated state.
Figure 6A:
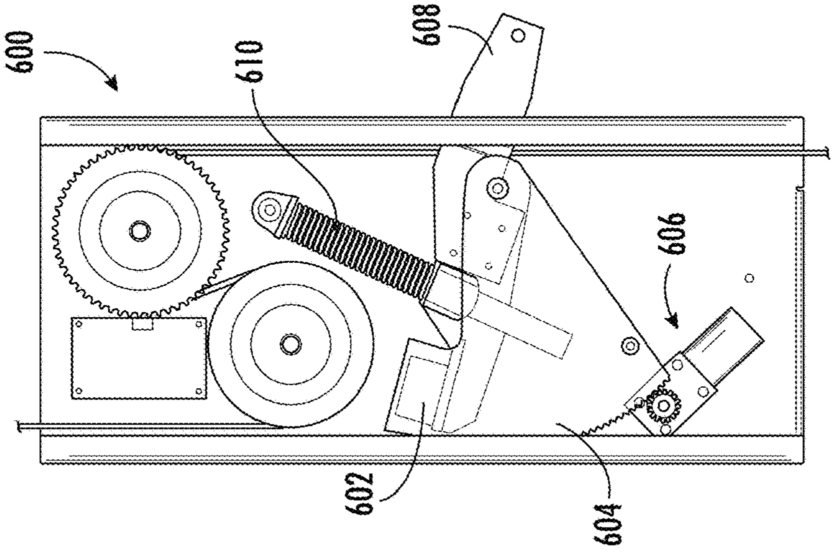
FIG. 6A is a schematic illustration of another configuration of an elevator system governor in accordance with an embodiment of the present disclosure.

Referring now to FIGS. 6A-6C, schematic illustrations of another configuration of a governor 600 for an elevator traveling component in accordance with an embodiment of the present disclosure are shown. FIG. 6A illustrates the governor 600 in the normal operating condition, where an elevator car may be free to travel along an elevator shaft. FIG. 6B illustrates a fully actuated state of the governor 600, which may occur after detection of an overspeed condition. FIG. 6C illustrates the governor 600 in a partial reset state illustrating features of the reset operation. Once the reset operation is complete, the governor 600 will be returned to the normal operating condition (FIG. 6A).

The governor 600 may be substantially similar to that shown and described above, and thus like features are not further described again for simplicity and ease of explanation. The primary difference of this configuration is the reset operation and mechanisms associated therewith. An electromagnet 602 is mounted to a reset arm 604, which is similar to the configuration shown in FIGS. 5A-5C, with a motored gear forming the driving mechanism of a reset assembly 606. The electromagnet 602 is configured to selectively and releasably engage with a trigger arm 608 that is operably connected to a safety brake assembly. A biasing element 610 is operably connected to the trigger arm 608. In this configuration, the biasing element 610 is a compression spring, rather than the extension springs shown in the embodiments illustrated above. As such, upon release of the magnetic force from the electromagnet 602, the trigger arm 608 may be released and urged downward by the extension of the biasing element 610 (FIG. 6B).

During reset, the reset arm 604 is driven downward such that the electromagnet 602 will contact the trigger arm 608 (FIG. 6C). The reset arm 604 may then be driven by the motored gear of the reset assembly 606 to return the system back to the normal operational state (FIG. 6A). During this operation, the biasing element 610 is compressed (as compared to the extension of the prior illustrated embodiments).

Figure 7B:
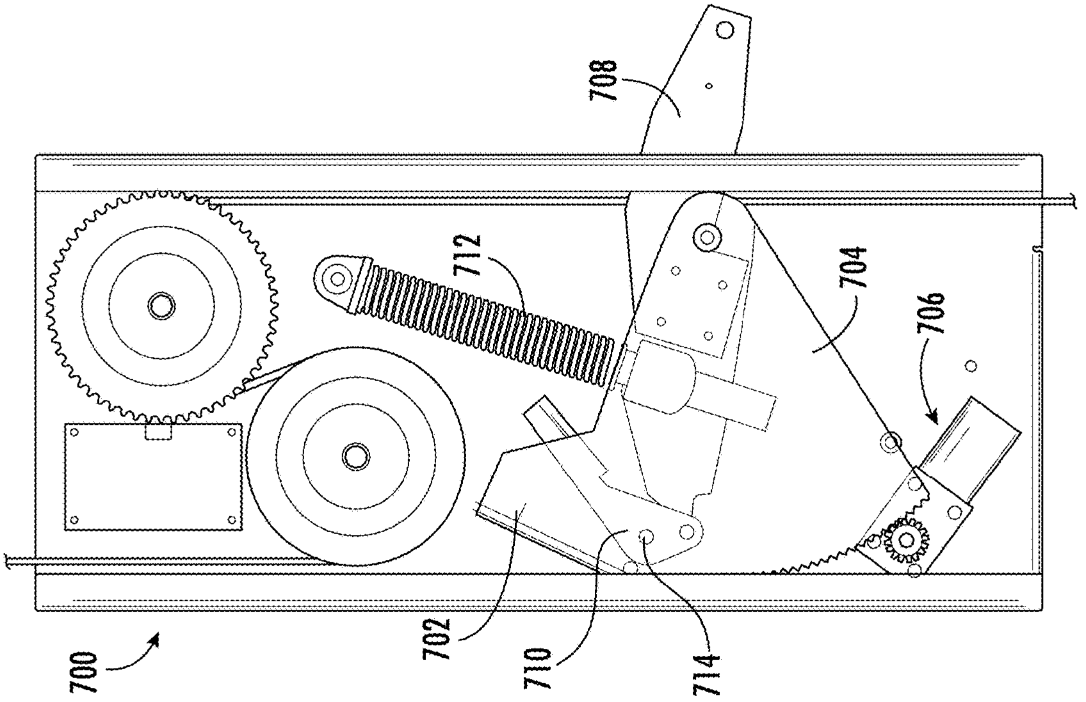
FIG. 7B is a schematic illustration of the elevator system governor of FIG. 7A shown in an actuated state.
Figure 7A:
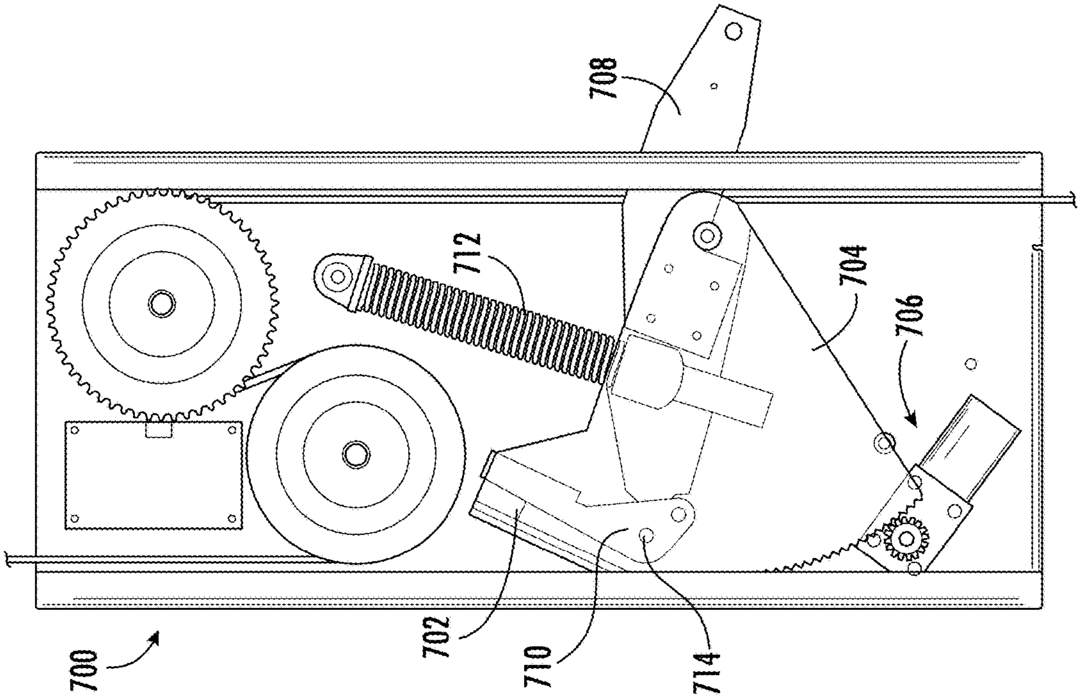
FIG. 7A is a schematic illustration of another configuration of an elevator system governor in accordance with an embodiment of the present disclosure.
Figure 7D:
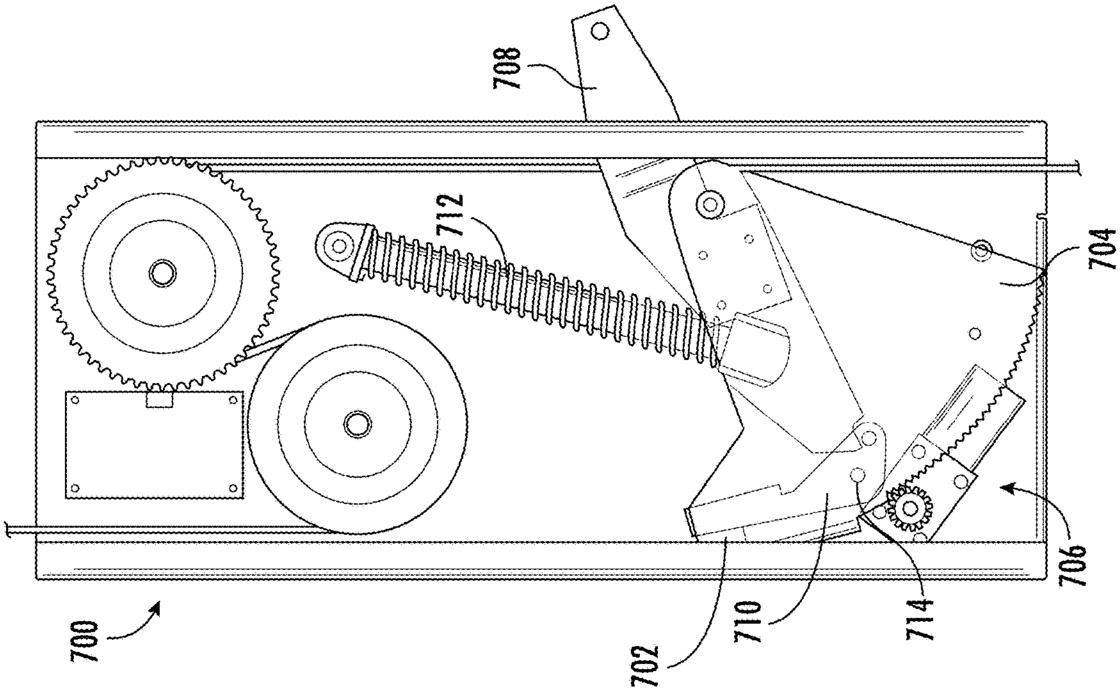
FIG. 7D is a schematic illustration of the elevator system governor of FIG. 7A shown in a subsequent partial state of reset after actuation.
Figure 7C:
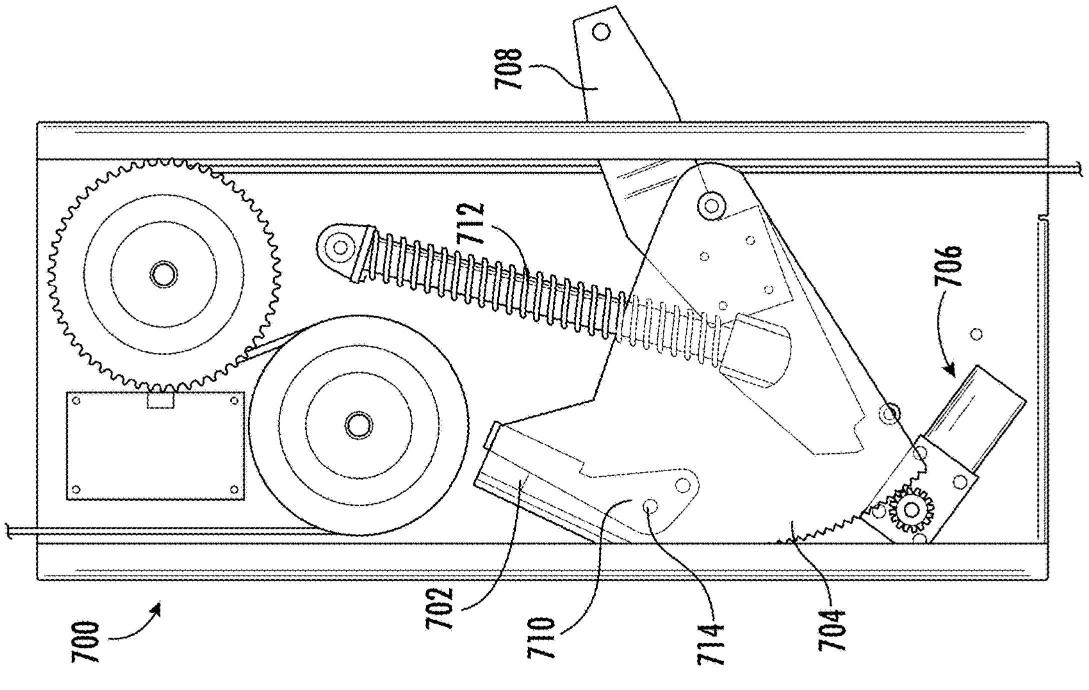
FIG. 7C is a schematic illustration of the elevator system governor of FIG. 7A shown in a partial state of reset after actuation.

Referring now to FIGS. 7A-7D, schematic illustrations of another configuration of a governor 700 for an elevator traveling component in accordance with an embodiment of the present disclosure are shown. FIG. 7A illustrates the governor 700 in the normal operating condition, where an elevator car may be free to travel along an elevator shaft. FIG. 7B illustrates a partially actuated (released) state of the governor 700, which may occur after detection of an overspeed condition. FIG. 7C illustrates a fully actuated state of the governor 700 in which a safety brake assembly is actuated and engaged to arrest movement of an elevator car. FIG. 7D illustrates the governor 700 in a partial reset state illustrating features of the reset operation. Once the reset operation is complete, the governor 700 will be returned to the normal operating condition (FIG. 7A).

The governor 700 may be substantially similar to that shown and described above, and thus like features are not further described again for simplicity and ease of explanation. The primary difference of this configuration is the reset operation and mechanisms associated therewith. An electromagnet 702 is mounted to a reset arm 704, which is similar to the configurations shown above, with a motored gear forming the driving mechanism of a reset assembly 706. In this configuration, the electromagnet 702 is configured to selectively and releasably engage with a trigger arm 708 via an intermediate arm 710. The intermediate arm 710 may be pivotably mounted to the reset arm 704 and selectively engageable with the trigger arm 708. The intermediate arm 710 may be configured as a latch structure that releasably supports an end of the trigger arm 708. Accordingly, in some embodiments, an end of the trigger arm 708 may include a feature, such as a hook or extension configured to rest upon or otherwise engage with the feature of the intermediate arm 710 (e.g., as shown in FIGS. 7A-7D). In some embodiments, the intermediate arm 710 may be biased toward engagement with the electromagnet 702, such as by a spring, a weight, or other biasing member/element (not shown). Such biasing element may be associated with a pivot point 714 (e.g., a pivot pin with a preloaded torque or the like).

The trigger arm 708 is operably connected to a safety brake assembly, as shown and described above. A biasing element 712 is operably connected to the trigger arm 708. In this configuration, the biasing element 712 is a compression spring. Upon release of the magnetic force from the electromagnet 702, the intermediate arm 710 may be released. With the magnetic force removed, the intermediate arm 710 is free to pivot about the pivot point 714. The biasing element 712 will apply a force on the trigger arm 708 and cause the trigger arm 708 to disengage from the intermediate arm 710, such as by pushing the intermediate arm 710 out of the way such that the intermediate arm 710 pivots about the pivot point 714. In embodiments with the intermediate arm 710 including a separate biasing feature, the biasing force applied by the biasing element 712 is selected to be greater than the biasing feature of the intermediate arm 710, thereby forcing the actuation of the trigger arm 708. As one end of the trigger arm 708 is urged downward, the other end is caused to travel upward, thereby causing the trigger arm 708 to actuate a safety brake assembly, as described above (e.g., as shown in FIG. 7C).

During reset, the reset arm 704 is driven downward by the reset assembly 706, illustrated as a toothed/geared/motored configuration. As the reset arm 704 is rotated downward, the intermediate arm 710 will be urged into contact with the trigger arm 708. As such the intermediate arm 710 will reengage with the end of the trigger arm 708 (FIG. 7D), which may be aided by a light biasing force applied to the intermediate arm 710, as noted above. The reset arm 704 may be further driven to a travel limit (FIG. 7D), at which point the electromagnet 702 may be energized to fixedly connect the trigger arm 708 to the reset arm 704 via the intermediate arm 710. The reset assembly 706 may then be operated in reverse direction to cause the reset arm 704, the trigger arm 708, and the intermediate arm 710 to be rotated as a single unit back to the initial position (FIG. 7A). During this operation, the biasing element 712 will be compressed and the biasing force thereof is overcome, thus energizing the biasing element 712 to prepare for the next actuation/operation. Also, during this operation, the operably connected safety brake assembly will be deactivated or disengaged from a guide rail to allow for normal operation of an associated elevator system.

Figure 8A:
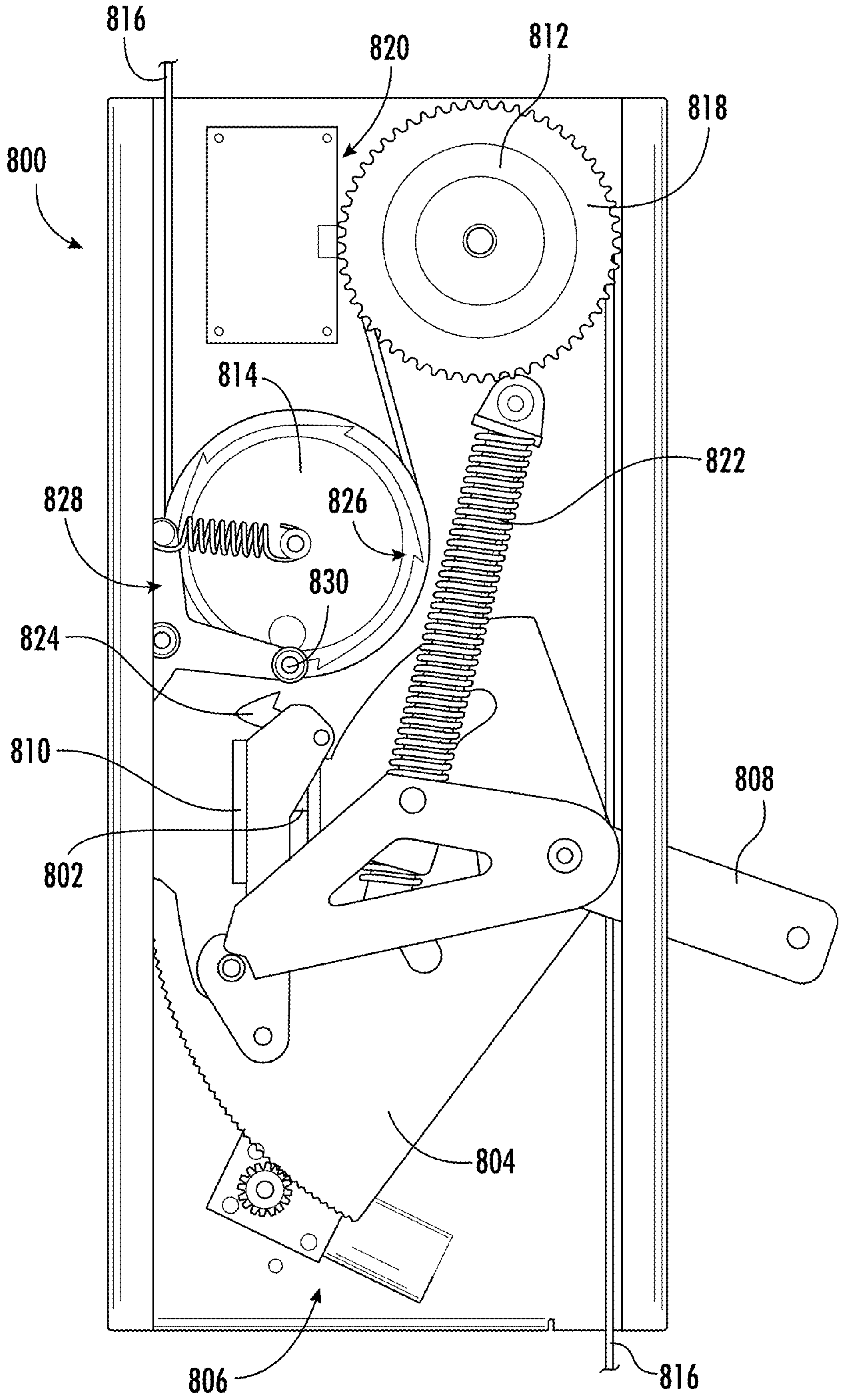
FIG. 8A is a schematic illustration of another configuration of an elevator system governor in accordance with an embodiment of the present disclosure.
Figure 8B:
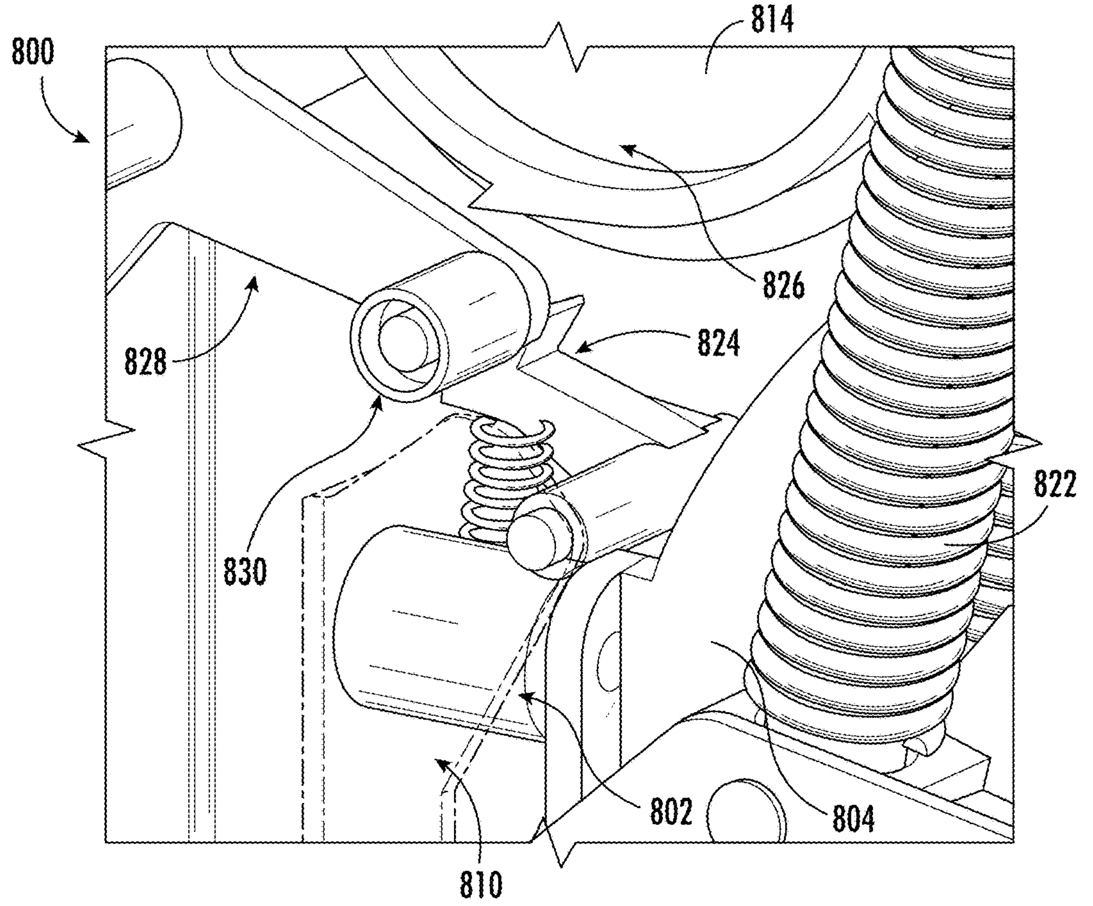
FIG. 8B is a schematic illustration of features of the elevator system governor of FIG. 8A.
Figure 8C:
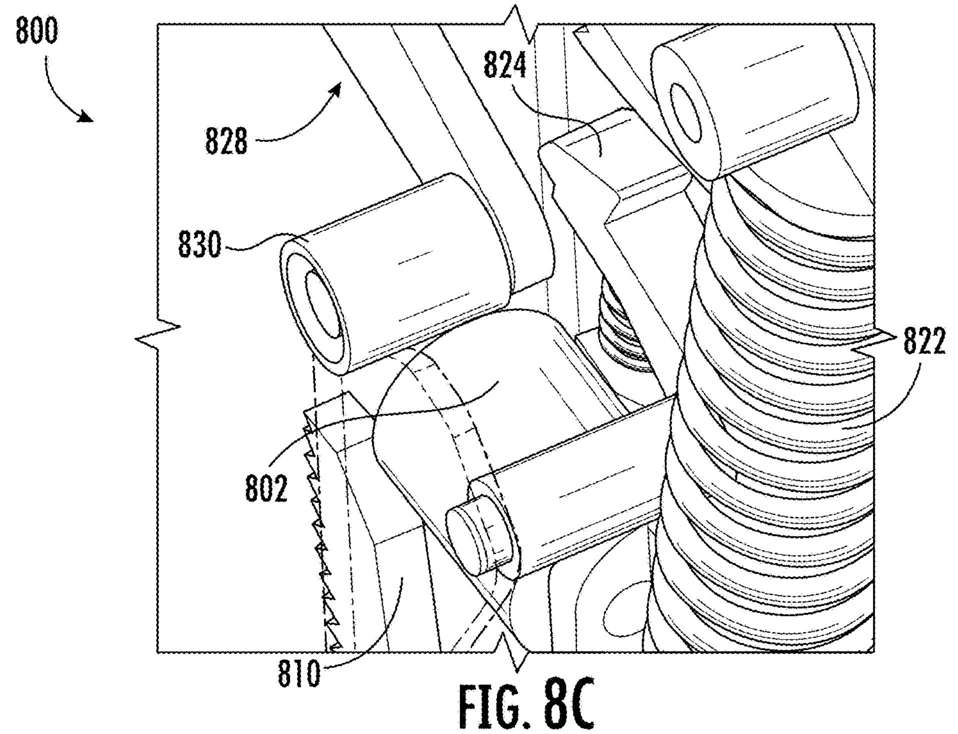
FIG. 8C is another schematic illustration of features of the elevator system governor of FIG. 8A.
Figure 8D:
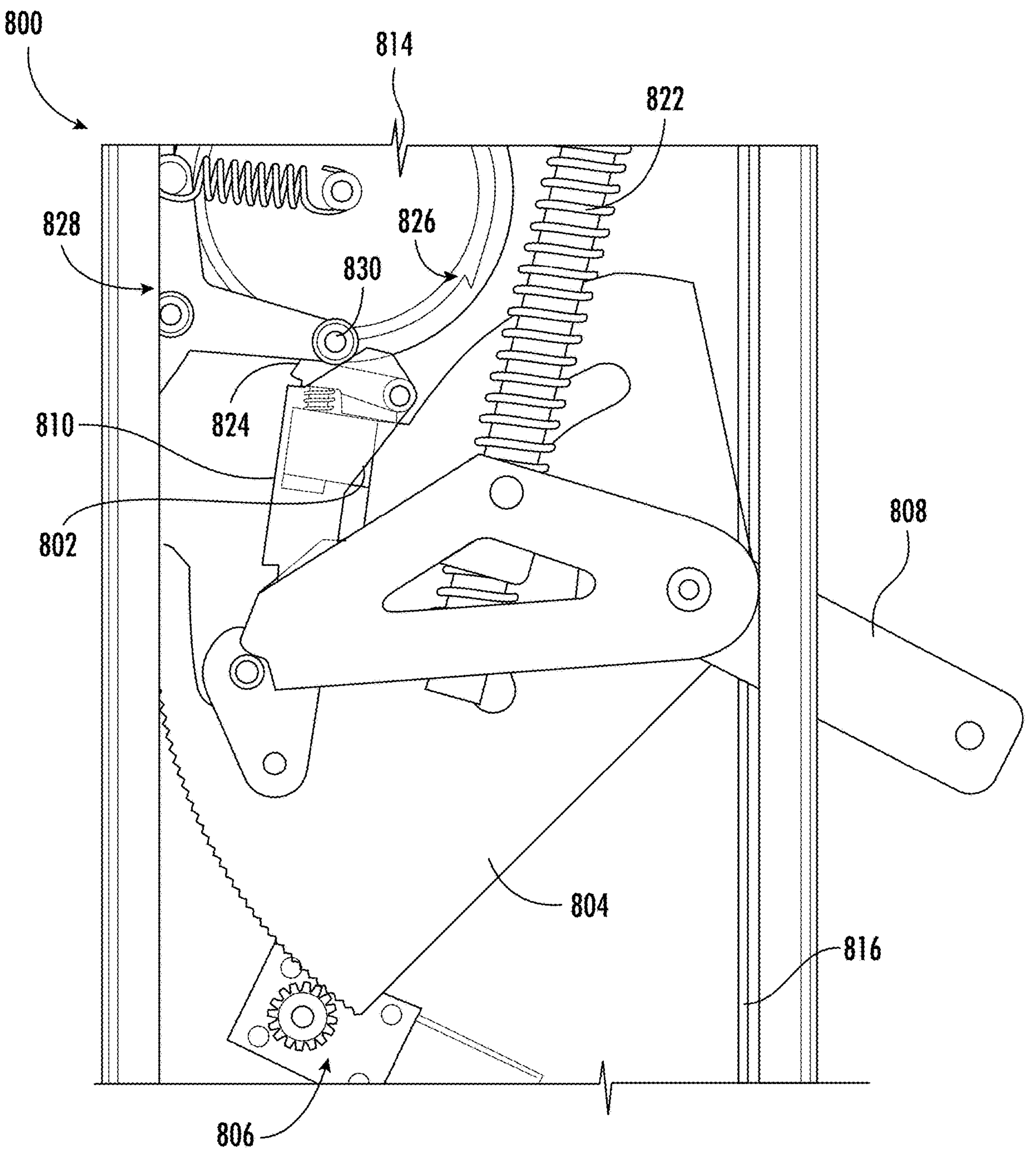
FIG. 8D is a schematic of the elevator governor system of FIG. 8A shown in a power loss condition.

Referring now to FIGS. 8A-8D, schematic illustrations of another configuration of a governor 800 for an elevator traveling component in accordance with an embodiment of the present disclosure are shown. FIGS. 8A-8C illustrate the governor 800 in the normal operating condition, where an elevator car may be free to travel along an elevator shaft, and FIG. 8D illustrates the governor 800 in a power loss condition. The governor 800 may be substantially similar to that shown and described above, and thus like features are not further described again for simplicity and ease of explanation. The governor 800 is similar to that shown and described with respect to FIGS. 7A-7C, having an electromagnet 802 mounted to a reset arm 804, which is similar to the configurations shown above, with a motored gear forming the driving mechanism of a reset assembly 806. In this configuration, the electromagnet 802 is configured to selectively and releasably engage with a trigger arm 808 via an intermediate arm 810. The intermediate arm 810 may be pivotably mounted to the reset arm 804 and selectively engageable with the trigger arm 808, as described above with respect to FIGS. 7A-7C. The intermediate arm 810 may be configured as a latch structure that releasably supports an end of the trigger arm 808. Accordingly, in some embodiments, an end of the trigger arm 808 may include a feature, such as a hook or extension configured to rest upon or otherwise engage with the feature of the intermediate arm 810.

The governor 800, as shown, includes a first pulley 812, a second pulley 814, and a cable 816 associated therewith, as shown and described above. The first pulley 812 includes a target element 818 which is detectable or monitored by a motion sensor assembly 820, as shown and described above. The motion sensor assembly 820 is configured to cause actuation of the governor 800 in the event of a detected overspeed condition, similar to that shown and described above. That is, due to an excessive speed detected at the motion sensor assembly 820, the electromagnet 802 may be deenergized, causing release of the intermediate arm 810 and application of force from a biasing element 822 to the trigger arm 808. The intermediate arm 810 may be pivoted out of the way of the trigger arm 808, allowing the trigger arm 808 to rotate and cause actuation of a linkage and associate safety brake assembly, as shown and described above.

In this configuration, the governor 800 includes additional features for addressing power loss conditions, independent from an overspeed event. During a power loss event, the governor 800 maintains a direct link to movement of the associated elevator car (e.g., interaction of the cable 818 with the pulleys 812, 814). The second pulley 814 includes a toothed configuration 826 that is arranged to selectively interact with the latch 824. During normal operation, the latch 824 is free from contact with the toothed configuration 826 of the second pulley 814.

During a power loss condition, the latch 824 is moved to make contact with the toothed configuration 826 of the second pulley 814. In some embodiments, the latch 824 may be spring-loaded and biased toward the toothed configuration 826. In accordance with embodiments of the present disclosure, the latch 824 is brought in contact with the toothed configuration 826 via the reset assembly 806. In accordance with embodiments, and following a power loss condition, the system would have enough backup power (e.g., battery, capacitor, etc.) to power the reset assembly

806 to bring the reset arm 804 upward, along with the intermediate arm 810, the trigger arm 808, and ultimately the latch 824, such that the latch 824 is now in contact with the toothed configuration 826.

A spring-loaded assembly 828 is provided with a retention roller 830. During the power loss condition, the intermediate arm 810 is brought into contact with the retention roller 830 by the upward motion of the reset arm 804 via the reset assembly 806, as previously described. The spring-loaded assembly 828 is configured to provide a securing mechanism to prevent the intermediate arm 810 from disengaging with the trigger arm 808 so that the safety brakes are not automatically lifted when power is removed from the electromagnet 802. Once the upward movement is complete and the intermediate arm 810 is in contact with the retention roller 830 on the spring-loaded assembly 828, the electromagnetic force from the electromagnet 802 is no longer needed to keep the intermediate latch 810 in the closed position. Rather, the spring-loaded assembly 828 provides the closing force. As such, power to the electromagnet can be released without also releasing the trigger arm 808. The state of the governor 800 during such a power loss condition is shown, for example, in FIG. 8D. It will be appreciated that if the elevator car moves upward, the toothed configuration 826 will rotate in a manner that does not engage with the latch 824 and will push the latch 824 out of the way, allowing for free upward movement of the traveling component (e.g., elevator car). The latch 824 and the toothed configuration 826 of the second pulley 814 may be configured to interact together such that if the elevator car is moved upward, the latch 824 will be moved out of the way as the toothed portions of the toothed configuration 826 pass by or slide past the latch 824.

However, during the power loss condition, if the elevator car moves downward (counter rotation of the second pulley 814), the latch 824 will engage with the toothed portions of the toothed configuration 826 on the second pulley 814. This rotation will apply a force to the latch 824 which can force the intermediate arm 810 to be rotated out of engagement with the trigger arm 808 by overcoming the closing force provided by the spring-loaded assembly 828. The trigger arm 808 is then biased into actuation against the biasing element 822, thereby causing the safety brake assembly to be actuated and lift associated safeties into engagement with a guide rail to stop downward movement of the traveling component.

As previously noted, in the power-loss state or condition, the spring-loaded assembly 828 is configured to provide a securing mechanism to prevent the intermediate arm 810 from disengaging with the trigger arm 808 so that the safety brakes are not automatically lifted (unless the traveling component travels downward). Additionally, the spring-loaded assembly 828 is configured to ensure the intermediate arm 810 is in contact with the electromagnet 802 so that when power is restored, the electromagnet 802 will be reenergized and the system may be restored to the normal operating state. When power is restored, the electromagnet 802 is powered and the reset assembly 806 is operated to move the reset arm 804 downward, thereby disengaging the latch 824 out of engagement with the toothed configuration 826. At the same time, the spring-loaded assembly 828 is disengaged from the intermediate arm 810, such as by separating contact between the retention roller 830 and the intermediate arm 810.

It will be appreciated by those of skill in the art in view of the teachings herein that the governor 800 in the configuration shown in FIGS. 8A-8D may be configured for release of the trigger arm based on either upward or downward motion. That is, in some configurations, the latching mechanism may be configured with a toothed configuration and associated/oriented latch that can result in release of the trigger arm either with upward movement or downward movement. It will be appreciated that the release mechanism of the present disclosed and illustrated configurations is related to releasing the trigger arm in response to downward motion.

In accordance with embodiments of the present disclosure, improved safety mechanisms for elevator systems are provided. The safety mechanisms of the present disclosure are related to the operation of governors for traveling components of the elevator systems (e.g., elevator cars, counterweights). The mechanisms disclosed herein provide for improved safety features to ensure tripping of elevator system safety brakes in the event of an overspeed event and/or power loss. Embodiments of the present disclosure eliminate a reliance upon a pull-through-force for safety actuation, as the trigger of the overspeed and actuation is caused by a motion sensor assembly. Such configurations can also eliminate false tripping of such safety systems and/or tedious calibration operations. These and other benefits and features of the present disclosure will be appreciated in view of the teachings herein.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. An elevator system governor comprising:

a housing configured to be mounted to a traveling component of an elevator system;

a first pulley arranged on the housing;

a second pulley arranged on the housing;

a cable wound about the first pulley and the second pulley, wherein the first and second pulleys are configured to travel along the cable;

a target element arranged on at least one of the first pulley and the second pulley;

a motion sensor assembly arranged to detect the target element and determine if an overspeed condition is present based thereon;

an electromagnet operably coupled to the motion sensor assembly, wherein the motion sensor assembly is configured to transition the electromagnet from a first electromagnetic state to a second electromagnetic state in response to a detected overspeed condition;

a trigger arm releasably connected to the electromagnet and operably coupled to a safety brake assembly, wherein the trigger arm is magnetically secured to the electromagnet when the electromagnet is in the first electromagnetic state, and when the electromagnet is transitioned to the second electromagnetic state, the trigger arm is configured to actuate the safety brake assembly; and a biasing element arranged to bias the trigger arm into an actuated state, wherein a magnetic force of the electromagnet is greater than a biasing force of the biasing element when the electromagnet is in the first electromagnetic state.

2. The elevator system governor of claim 1, further comprising a reset arm, wherein the electromagnet is fixedly attached to the reset arm.

3. The elevator system governor of claim 2, further comprising a reset assembly arranged to cause the reset arm to move the electromagnet into contact with the trigger arm when the trigger arm is in the actuated state.

4. The elevator system governor of claim 3, wherein the reset assembly is configured to apply a force to the reset arm and the trigger arm, via the electromagnet, to overcome the biasing force of the biasing element, and reset the trigger arm to a normal operating state.

5. The elevator system governor of claim 3, wherein the reset assembly comprises a linear actuator.

6. The elevator system governor of claim 3, wherein the reset assembly comprises a motored gear and the reset arm comprises a toothed portion configured to be driven by the motored gear.

7. The elevator system governor of claim 3, further comprising an intermediate arm rotationally mounted to the reset arm, wherein the intermediate arm is configured to releasably be retained by the electromagnet and the trigger arm is configured to selectively engage with the intermediate arm.

8. The elevator system governor of claim 1, wherein the motion sensor assembly comprises a control element with a processing unit and a detector element arranged to detect the target element.

9. The elevator system governor of claim 1, further comprising:

a toothed configuration on at least one of the first pulley and the second pulley; and a latch operably mounted to the reset arm, wherein the latch is configured to engage with the toothed configuration during a loss of power to the elevator system governor.

10. The elevator system governor of claim 9, wherein the latch is configured to be engaged with the toothed configuration during motion of the respective traveling component to cause actuation of the trigger arm.

11. The elevator system governor of claim 1, wherein the biasing element is a compression spring.

12. The elevator system governor of claim 1, wherein the biasing element is an expansion spring.

13. The elevator system governor of claim 1, wherein the traveling component is an elevator car.

14. The elevator system governor of claim 1, wherein the first electromagnetic state is an energized state of the electromagnet and the second electromagnetic state is a deenergized state of the electromagnet.

* * * * *